(12) United States Patent
Sasaki et al.

(10) Patent No.: US 7,159,226 B2
(45) Date of Patent: Jan. 2, 2007

(54) ELECTRONIC INSTRUMENT HAVING FIRST AND SECOND OPERATION UNITS

(75) Inventors: Takahiro Sasaki, Kawagoe (JP); Akira Shimizu, Kawagoe (JP); Nobumitsu Kasahara, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 972 days.

(21) Appl. No.: 10/085,018

(22) Filed: Mar. 1, 2002

(65) Prior Publication Data

US 2002/0132604 A1 Sep. 19, 2002

(30) Foreign Application Priority Data

Mar. 5, 2001 (JP) ............................. 2001-060576

(51) Int. Cl.
*G11B 33/02* (2006.01)
(52) U.S. Cl. ..................................... 720/646
(58) Field of Classification Search ................ 720/646, 720/647
See application file for complete search history.

(56) References Cited

U.S. PATENT DOCUMENTS 5,177,730 A * 1/1993 Utsugi ........................ 720/646
5,848,042 A 12/1998 Takahashi et al.
5,862,468 A 1/1999 Kim
5,953,302 A * 9/1999 Kobayashi ................... 720/647
6,398,168 B1 * 6/2002 O Tae ......................... 248/27.3

FOREIGN PATENT DOCUMENTS

DE  90 07 501 U  2/1992
DE  195 35 678 A  3/1997

* cited by examiner

*Primary Examiner*—David Davis
(74) *Attorney, Agent, or Firm*—Sughrue Mion, PLLC

(57) ABSTRACT

An electronic instrument 1 includes an instrument body 2, a first operation unit 3, a second operation unit 4 and a drive mechanism. The first operation unit 3 and the second operation unit 4 are moved over a first position, a second position and a third position by the drive mechanism. At the first position, the first operation unit 3 covers the second operation unit 4. The first operation unit 3 and the second operation unit 4 move downward from the first position. At the third position, a recording medium insertion slot is exposed. The first operation unit 3 moves downward from the third position whereas the second operation unit 4 moves upward from the third position. At the second position, the exposed planes 8a and 11a are exposed. In the above configuration, there is provided an electronic instrument which can easily visually recognize the operating state of itself.

15 Claims, 18 Drawing Sheets

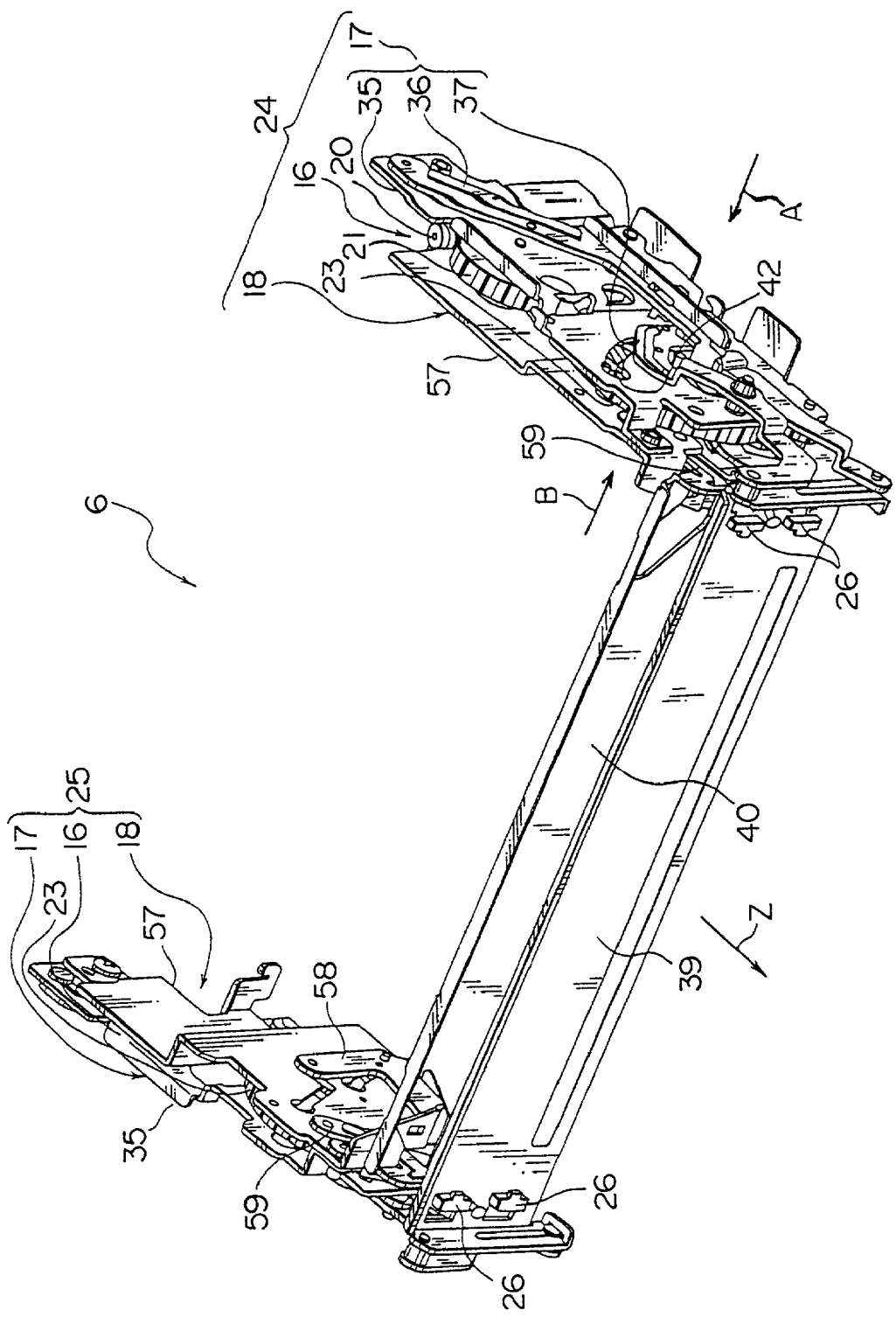

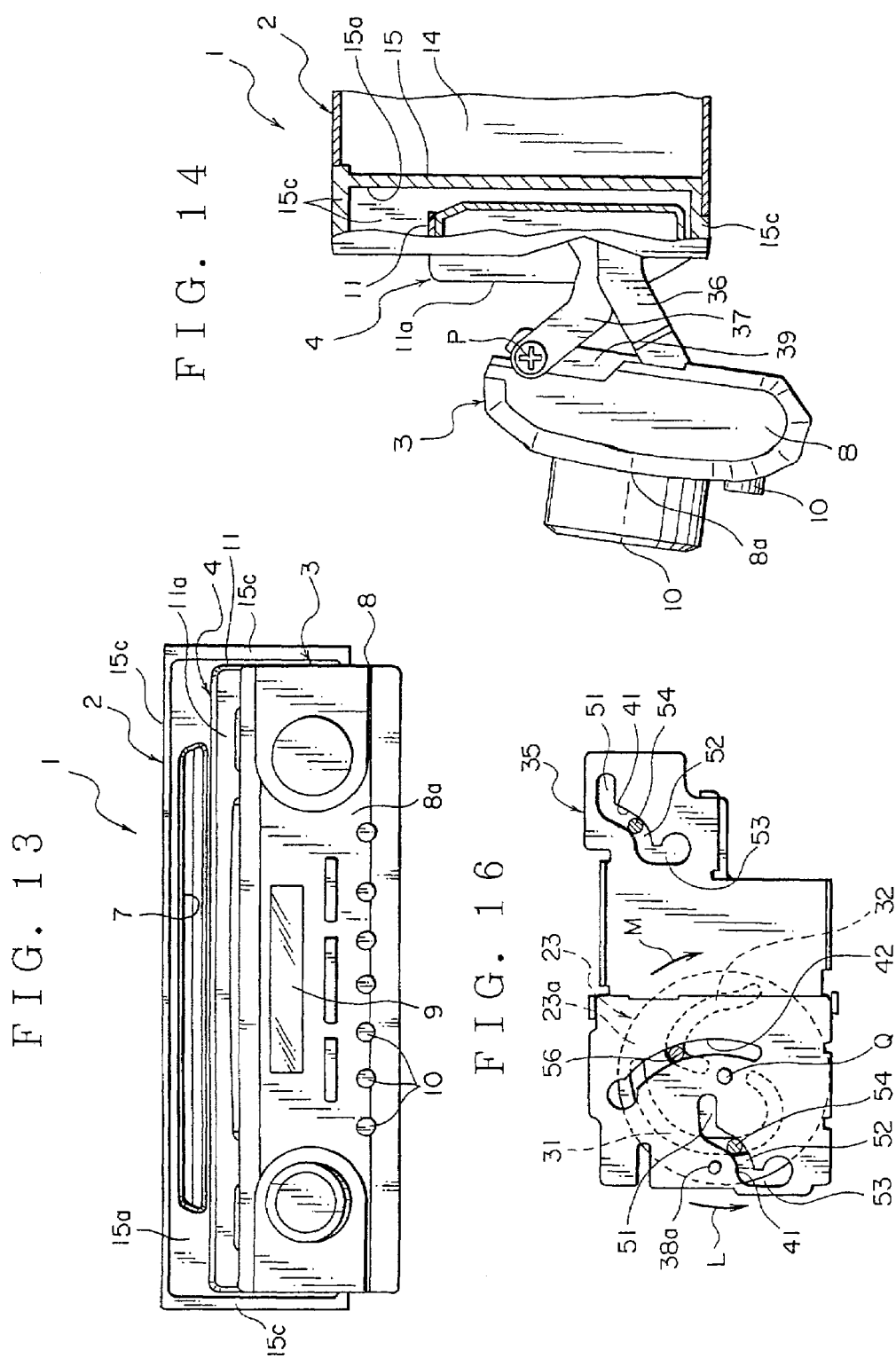

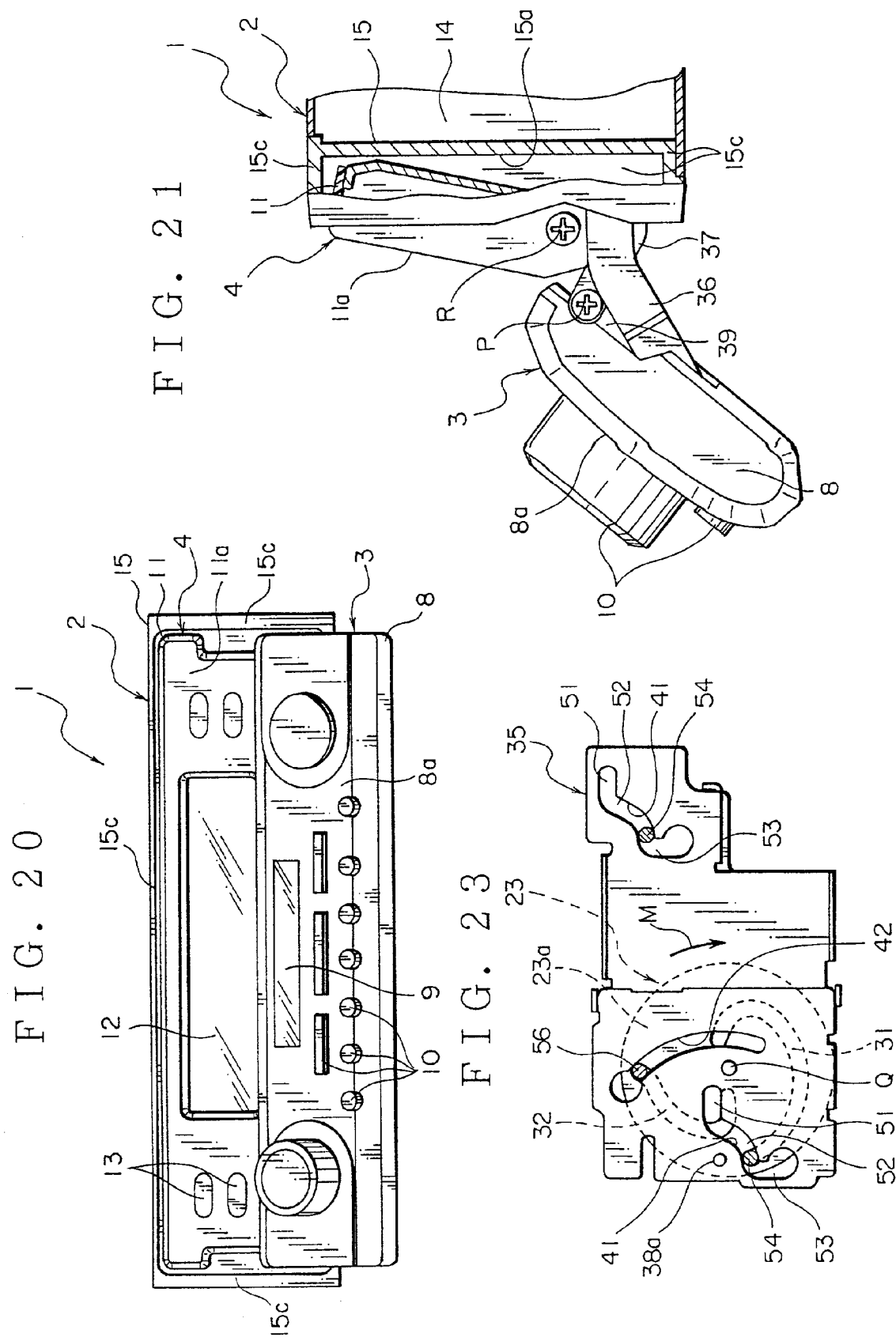

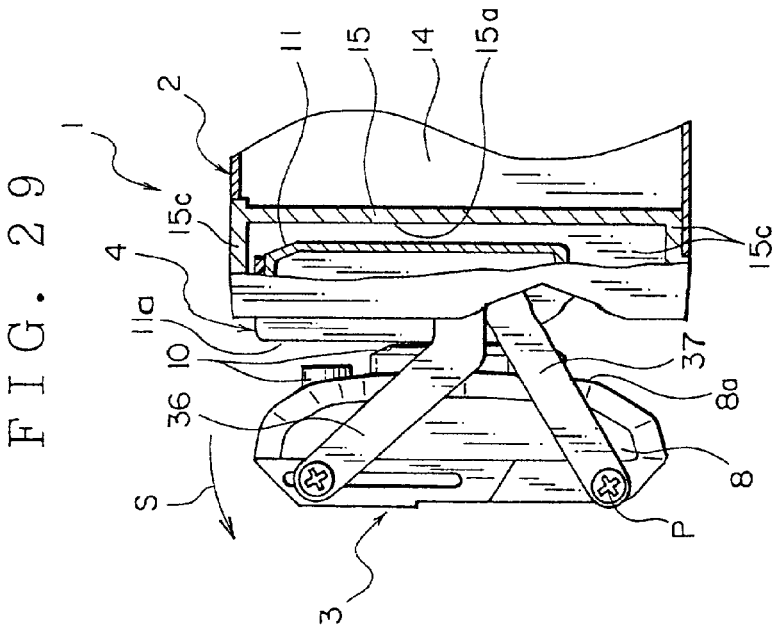
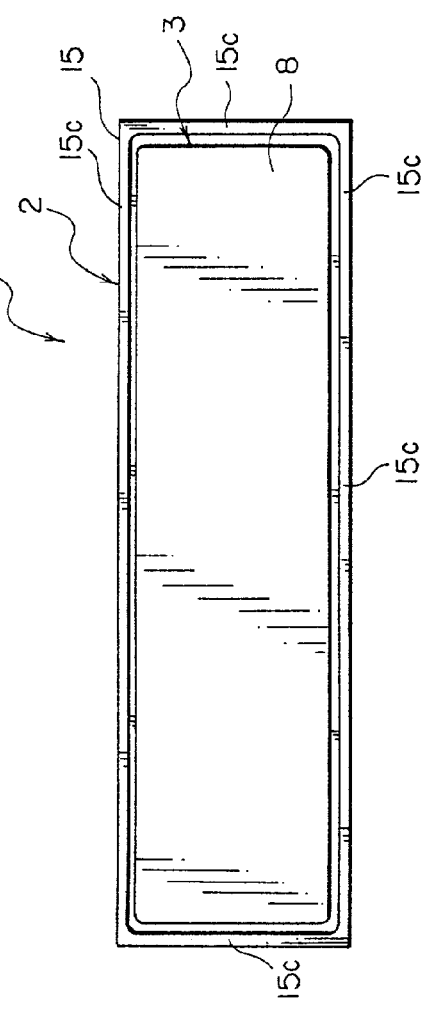
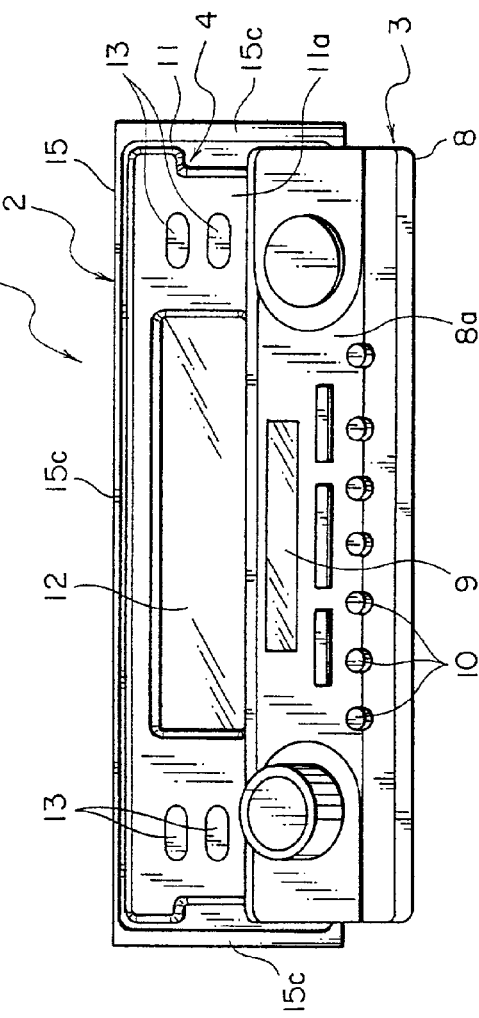

ELECTRONIC INSTRUMENT HAVING FIRST AND SECOND OPERATION UNITS

BACKGROUND OF THE INVENTION

1. Field of the Invention

This invention relates to electronic instrument such as an audio device which mounted on e.g. a vehicle which is a moving body.

2. Description of the Related Art

Conventional electronic instrument includes various car audio devices such as a compact disk (hereinafter referred to as CD) player, a mini-disc (MD) player, an AM/FM tuner, etc. which are mounted on an instrument panel (hereinafter referred to as "inpane") of a vehicle which is a moving body. The car audio device is an electronic instrument 101 (FIG. 34) which incorporates e.g. the CD player and the AM/FM tuner which are accommodated in a box.

The electronic instrument 101 as illustrated in FIG. 34 includes an instrument body 102 attached to the inpane and an operation unit 103 which is movably attached to the instrument body 102. The instrument body 102 is formed in a box shape. The instrument body incorporates the AM/FM tuner and a player for playing the CD back.

The instrument body 102 has a recording medium inserting slot 107 on a plane 102a which faces a user when attached to the inpane. The recording medium inserting slot 107 is adapted so as to permit the CD which is a recording medium to be freely inserted.

The operation unit 103 includes various switches 104 for tuning the AM/FM broadcasting station and selecting a piece of music, and a display panel 105 which displays the tuned state and the selected state of the music. The operation unit 103 is attached to the instrument body 102 so that it is movable between a first position where the plane 102a is covered so as to cause the display panel 105 to face the user (FIG. 34) and a second position where the plane 102a is opened so as to radio expose the recording medium inserting slot 107 and orient the display panel upward (FIG. 35).

The operation unit 103 of the electronic instrument 101 illustrated in FIG. 34 is moved from the first position to the second position (FIG. 35) so that the lower end of the operation unit 103 projects forward from the one plane of the instrument body 102 and the upper end thereof is moved downward. Thus, the recording medium inserting slot 107 is exposed.

At the second position of the operation unit 103, the user inserts the CD into the instrument body 102 through the recording medium inserting slot 107 and takes it out therefrom. At the first position of the operation unit 103, the user operates the various switches 104 to change the source between the AM/FM tuner and CD player and to make the tuning of the tuner and song selection in the CD player.

In the conventional electronic instrument 101, since the operation unit 103 is provided with the various switches 104 and display panel 105, the display area is narrow so that the user is difficult to recognize the information displayed on the display panel visually.

Further, as shown in FIG. 36, even where the display panel 105 is provided on the one plane 102a of the instrument body 102, the display area of the display panel 105 is narrow. In this way, the conventional electronic instrument 101 has a tendency of making the operation status of the instrument itself difficult to recognize visually.

SUMMARY OF THE INVENTION

In view of the problem described above, this invention has been accomplished. An object of this invention is to provide electronic instrument which permits the operation status of the instrument body to be visually recognized appropriately.

In accordance with this invention, in order to attain the above object, there is provided an electronic instrument comprising an instrument body, a first operation unit and a second operation unit which are movable relatively to the instrument body, wherein the first operation unit and second operation unit have exposed planes to be exposed in front of a plane of the instrument body, the first operation unit and second operation unit are movable between a first position where the exposed planes being arranged in parallel in a direction perpendicular to the plane of the instrument body and the second operation unit is located between the first operation unit and the plane of the instrument body, and a second position where the respective exposed planes of the first operation unit and the second operation unit are exposed, and the first operation unit and the second operation unit are moved relatively to the instrument body when they are moved between the first position and the second position.

In this configuration, the exposed planes of the first operation unit and the second operation unit are exposed at the second position. Therefore, by providing the display panels such as liquid crystal display on the exposed planes, the display area of the display panels can be increased.

Further, the first operation unit and the second operation unit are individually moved relatively to the instrument body. For this reason, in the movement of these units to the second position where the exposed planes are exposed, their displacement from the instrument body can be minimized.

Thus, where the electronic instrument is attached to the instrument panel, interference of the first operation unit and the second operation unit with an instrument such as a gear lever of a vehicle can be prevented.

In a preferred embodiment of this invention, a recording medium inserting slot from which a recording medium can be inserted into the instrument body is made in the plane of the electronic instrument, the recording medium inserting slot is covered with the second operation unit when the first operation unit and the second operation unit is located at the first position, and the first operation unit and the second operation unit are movable relatively to the instrument body to a third position where the recording medium inserting slot is exposed.

In this configuration, the first operation and the second operation can be moved to the third position where the recording medium inserting slot is exposed. Therefore, a recording medium can be surely inserted into the instrument body.

In still another preferred embodiment of this invention, the first operation unit moves from the first position so as to leave from the plane of the instrument body in a direction perpendicular to the plane of the instrument body, and thereafter moves downward of the instrument body to the second position.

In this configuration, the first operation unit moves from the first position to the second position in such a fashion that it leaves from the plane of the instrument body and thereafter moves downward. Therefore, at the second position, the exposed planes do not overlap each other.

In a further preferred embodiment, the second operation unit moves downward of the instrument body from the first position to the third position in a direction in parallel to the plane of the instrument body and moves from the third position to the second position upward of the instrument body.

In this configuration, the second operation unit moves downward so that it moves from the first position to the third position. Therefore, at the third position, the recording medium inserting slot can be exposed surely.

Further, the second operation unit moves upward from the third position to the second position. This prevents the exposed planes of the first operation unit and second operation unit from overlapping each other at the second position.

In a further preferred embodiment, the second operation unit moves from the third position to the second position after the first operation unit has moved to the second position or while the first operation unit moves toward the second position.

In this configuration, the second operation unit moves from the third position to the second position after the first operation unit has moved to the second position or while the first operation unit moves toward the second position. This surely prevents the exposed planes of the first operation unit and second operation unit from overlapping each other at the second position.

In a further preferred embodiment, immediately after the first operation unit has been situated at the second position, it is rotated around a first rotary center in a width direction of the instrument body so that the exposed plane of the first operation unit is oriented upward.

In this configuration, at the second position, the exposed plane of the first operation unit is oriented upward. The display panel provided on the exposed plane is made opposite to the user. Thus, the user can easily visually recognize the information displayed on the display panel.

In a further preferred embodiment of this invention, immediately after the second operation unit has been situated at the second position, it is rotated around a second rotary center in a width direction of the instrument body so that the exposed plane of the second operation unit is oriented upward.

In this configuration, at the second position, the exposed plane of the second operation unit is oriented upward. In this case, the display panel provided on the exposed plane is made opposite to the user. Thus, the user can easily visually recognize the information displayed on the display panel.

In a further preferred embodiment of this invention, when the first operation unit and the second operation unit have been situated at the second position, their respective exposed planes become in parallel to each other.

In this configuration, at the second position, the exposed planes of the first operation unit and second operation unit are in parallel to each other. Therefore, by providing the display panels on the exposed planes, the user can satisfactorily visually recognize the information displayed thereon.

In a further preferred embodiment of this invention, the first operation unit is detachable from an inner lid attached to the instrument body, the inner lid with the first operation unit attached is movable between the first position and second position, when the first operation unit is detached from the inner lid, the second operation unit is situated at the first position between the inner lid and the plane of the instrument body, and the inner lid and the second operation unit are arranged in parallel in a direction perpendicular to the plane of the instrument body.

In this configuration, when the first operation unit is detached from the inner lid, both the inner lid and the second operation unit move so that the second operation unit is situated between the inner lid and the plane of the instrument body. Therefore, when the first operation unit is detached, the inner lid covers the plane of the instrument body and the second operation unit.

Therefore, when the first operation unit is detached, the electronic instrument itself can be deactivated. Therefore, designing the first operation unit as a detachable panel is effective to prevent burglaries.

In a further preferred embodiment, when the first operation unit and the second operation unit are situated at the first position, their exposed planes are opposite to each other, and while the first operation unit moves from the first position to the second position, it rotates around a first rotary center in a width direction of the instrument body so that its exposed plane is oriented in a direction reverse to that when the first operation unit is situated at the first position.

In this configuration, at the second position, the respective exposed planes of the first operation unit and second operation unit are exposed. Therefore, by providing the display panels such as liquid crystal display on the exposed planes, the display area of the display panel can be increased.

Further, the first operation unit and the second operation unit are individually moved relatively to the instrument body. In the movement of these units to the second position where the exposed planes are exposed, their displacement from the instrument body can be minimized.

Therefore, where the electronic instrument is attached to the instrument panel, interference of the first operation unit and the second operation unit with instrument such as a gear lever of a vehicle can be prevented.

In a further preferred embodiment, immediately after the first operation unit has been situated at the second position, it is rotated around the first rotary center in a width direction of the instrument body to orient the exposed plane thereof upward, and immediately after the second operation unit has been situated at the second position, it is rotated around the second rotary center in a width direction of the instrument body to orient the exposed plane thereof upward.

In this configuration, the exposed planes of the first operation unit and the second operation unit is oriented upward. In this case, the display panels provided on the exposed planes are made opposite to the user. Thus, the user can satisfactorily visually recognize the information displayed on the display panels.

The above and other objects and features of this invention will be more apparent from the following description taken in conjunction with the accompanying drawings.

BRIEF DESCRIPTION OF THE DRAWINGS

FIG. 6 is a front view of the state when the first operation unit and the second operation unit of an electronic instrument have been displaced to the first position;

FIG. 7 is a side view partially in section of the electronic instrument in the state when the first operation unit and the second operation unit of an electronic instrument have been moved to the first position;

FIG. 8 is a perspective view of the driving mechanism in the state when the first holder and the second holder have moved to the first position;

FIG. 9 is a side view of a first frame relative and a cam gear viewed in a direction of arrow A in FIG. 8 to show the relative positions therebetween.

FIG. 13 is a front view of the electronic instrument when the first operation unit and second operation unit shown in FIG. 1 have moved to the third position;

FIG. 14 is a side view of an electronic instrument partially in section when the first operation unit and second operation unit shown in FIG. 1 have moved to the third position;

FIG. 16 is a side view of the first frame and cam gear viewed in a direction of arrow C in FIG. 15 to show the relative positions therebetween;

FIG. 20 is a front view of an electronic instrument when the first operation unit and second operation unit thereof shown in FIG. 1 have moved to the second position;

FIG. 21 is a side view of an electronic instrument partially in section when the first operation unit and second operation unit have moved to the second position;

FIG. 23 is a side view of the first frame and cam gear viewed in a direction of arrow E in FIG. 22;

FIG. 28 is a front view of an electronic instrument when the first operation unit and the second operation unit thereof have moved to the first position according to another modification of this invention;

FIG. 29 is a side view of an electronic instrument shown in FIG. 28 partially in section when the first operation unit and the second operation unit have moved to the first position;

FIG. 30 is a side view of an electronic instrument shown in FIG. 28 partially in section when the first operation unit and the second operation unit have moved to the second position;

DESCRIPTION OF THE PREFERRED EMBODIMENTS

Referring to FIGS. 1 to 26, an explanation will be given of electronic instrument 1 according to a first embodiment of this invention.

The electronic instrument 1 is mounted on an instrument panel ("inpane") of a vehicle which is a moving body. The electronic instrument includes various car audio devices such as a compact disk (hereinafter referred to as CD) player which incorporates a compact disk (CD) serving as a recording medium to play back the information recorded on the CD as sound and an AM/FM tuner which receives AM/FM broadcasting radio wave to produce the received information as sound.

Figure 1:
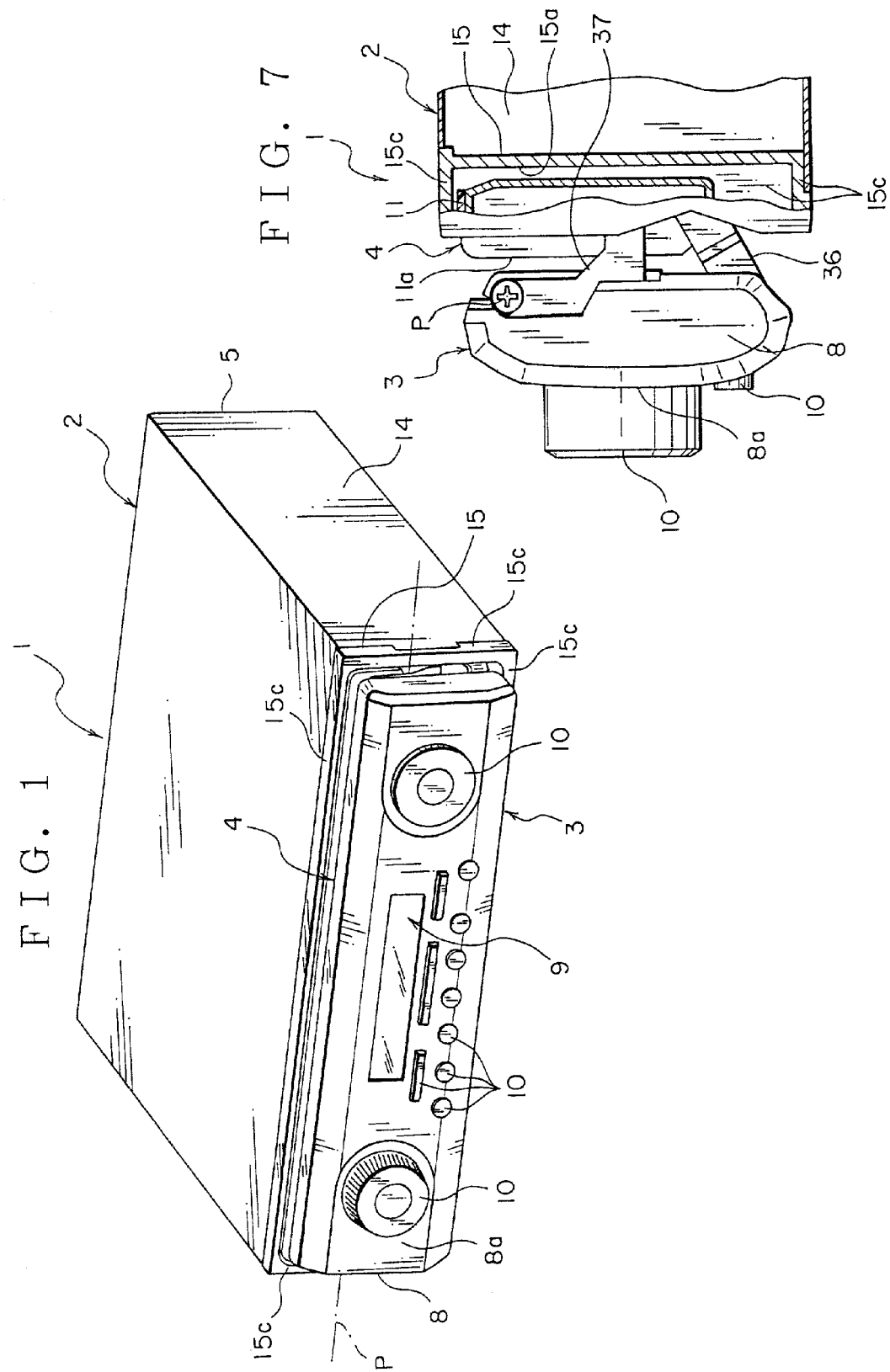
FIG. 1 is a perspective view of an electronic instrument according to an embodiment of this invention.
Figure 2:
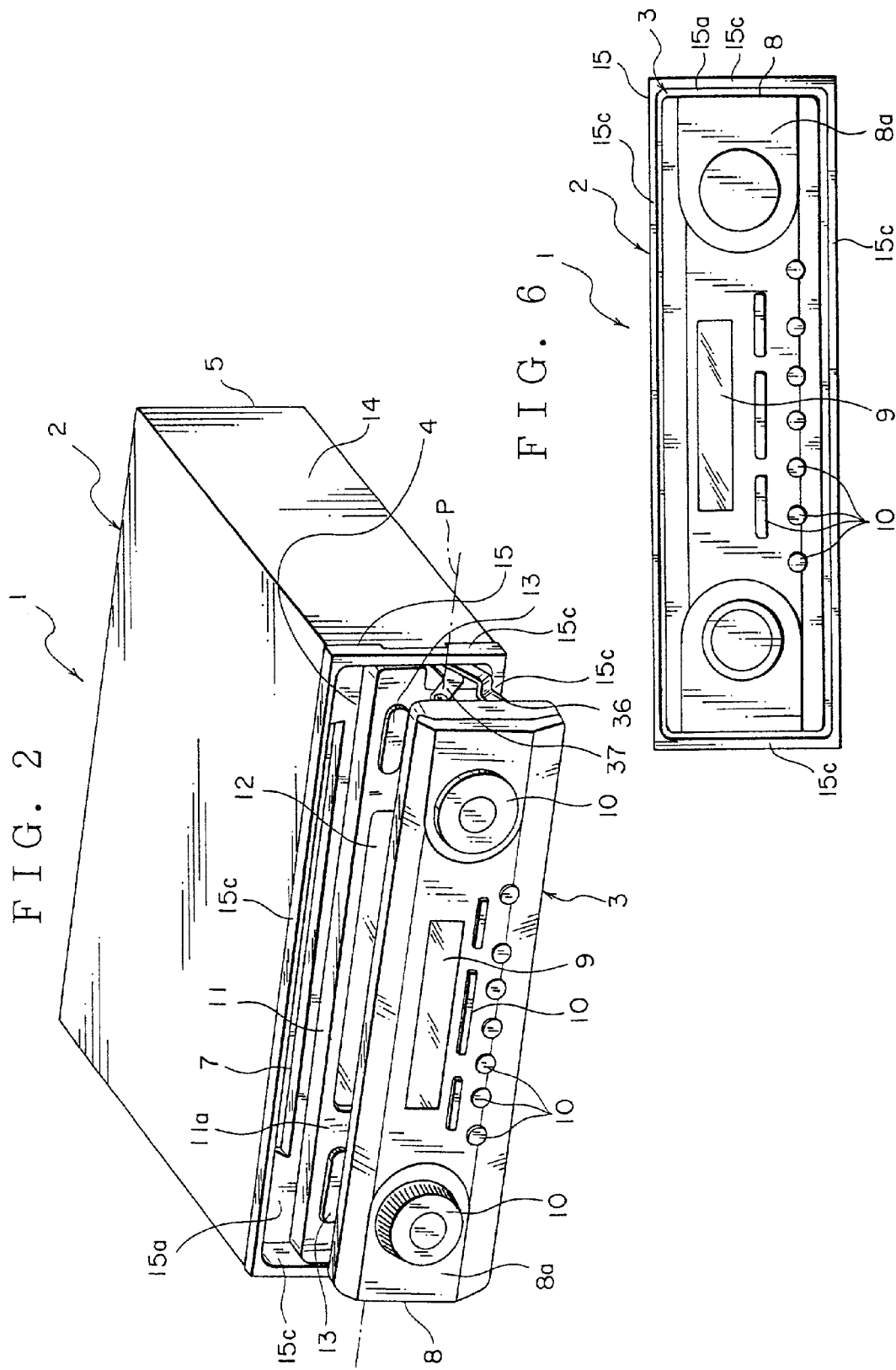
FIG. 2 is a perspective view showing the state where the first operation unit and the second operation unit of the electronic instrument shown in FIG. 1 have moved to the third position.
Figure 3:
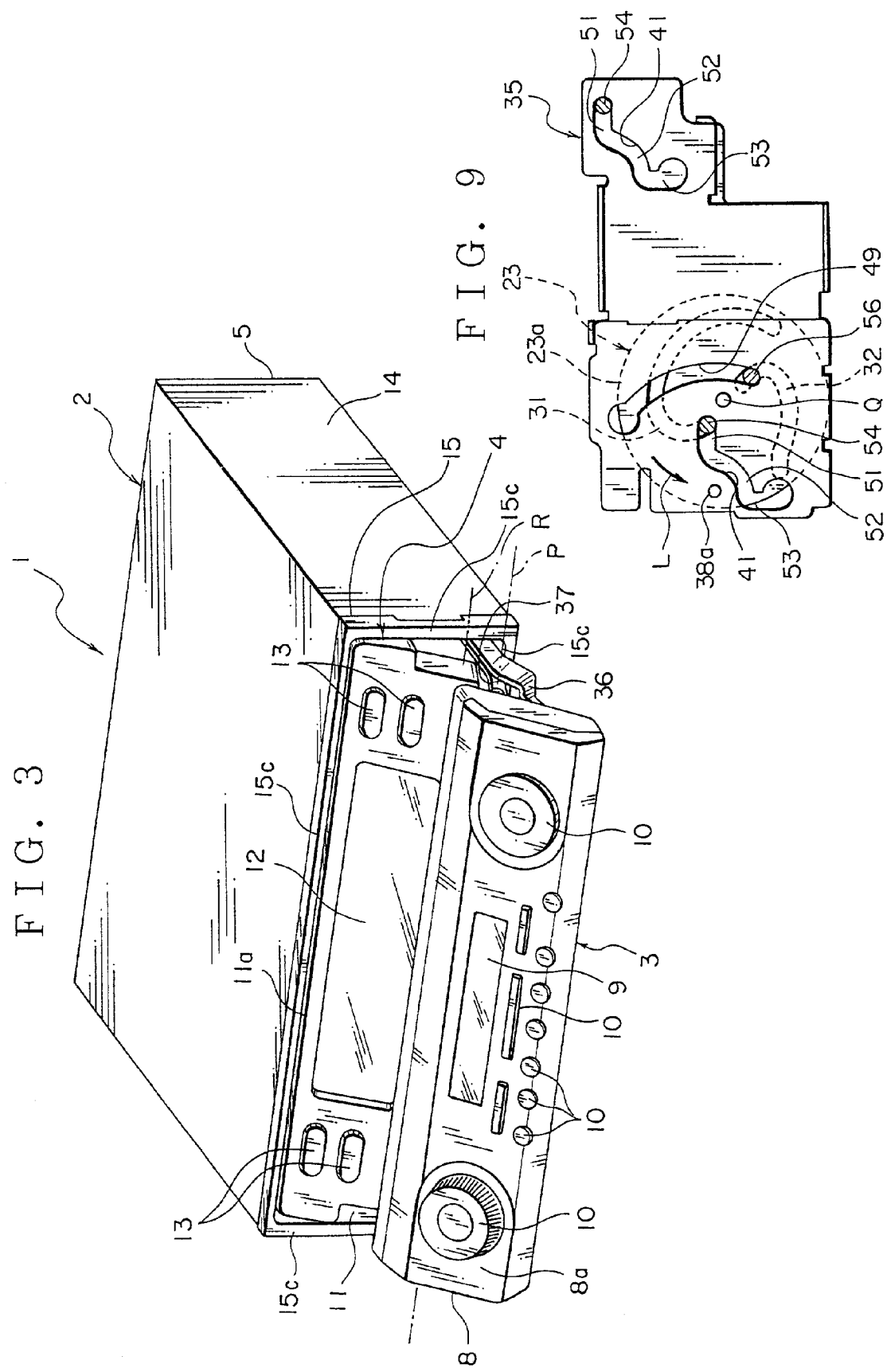
FIG. 3 is a perspective view showing the state where the first operation unit and the second operation unit of the electronic instrument shown in FIG. 1 have moved to the second position.
Figure 4:
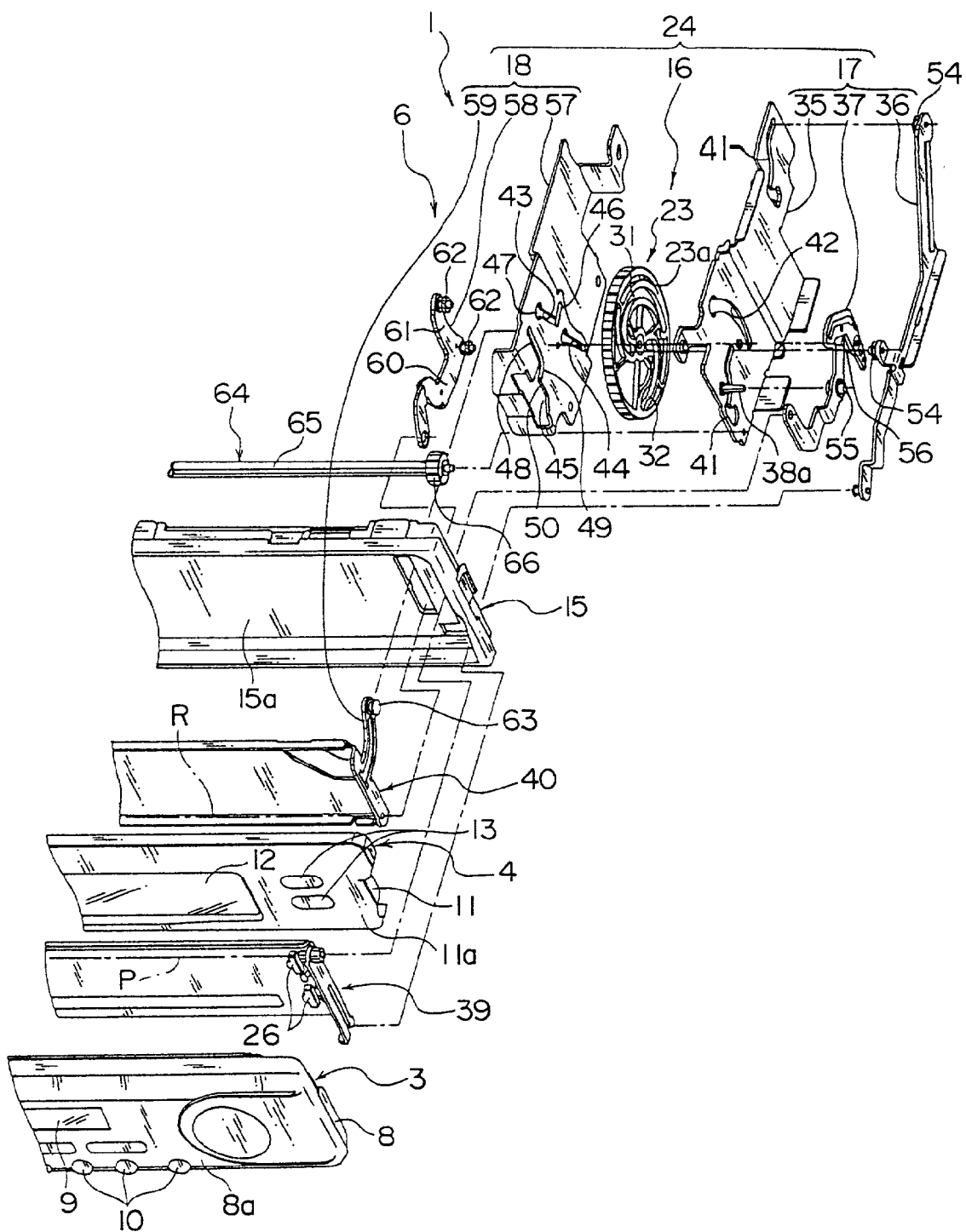
FIG. 4 is a exploded perspective view of a first driving unit of a driving mechanism of an electronic instrument shown in FIG. 1.
Figure 5:
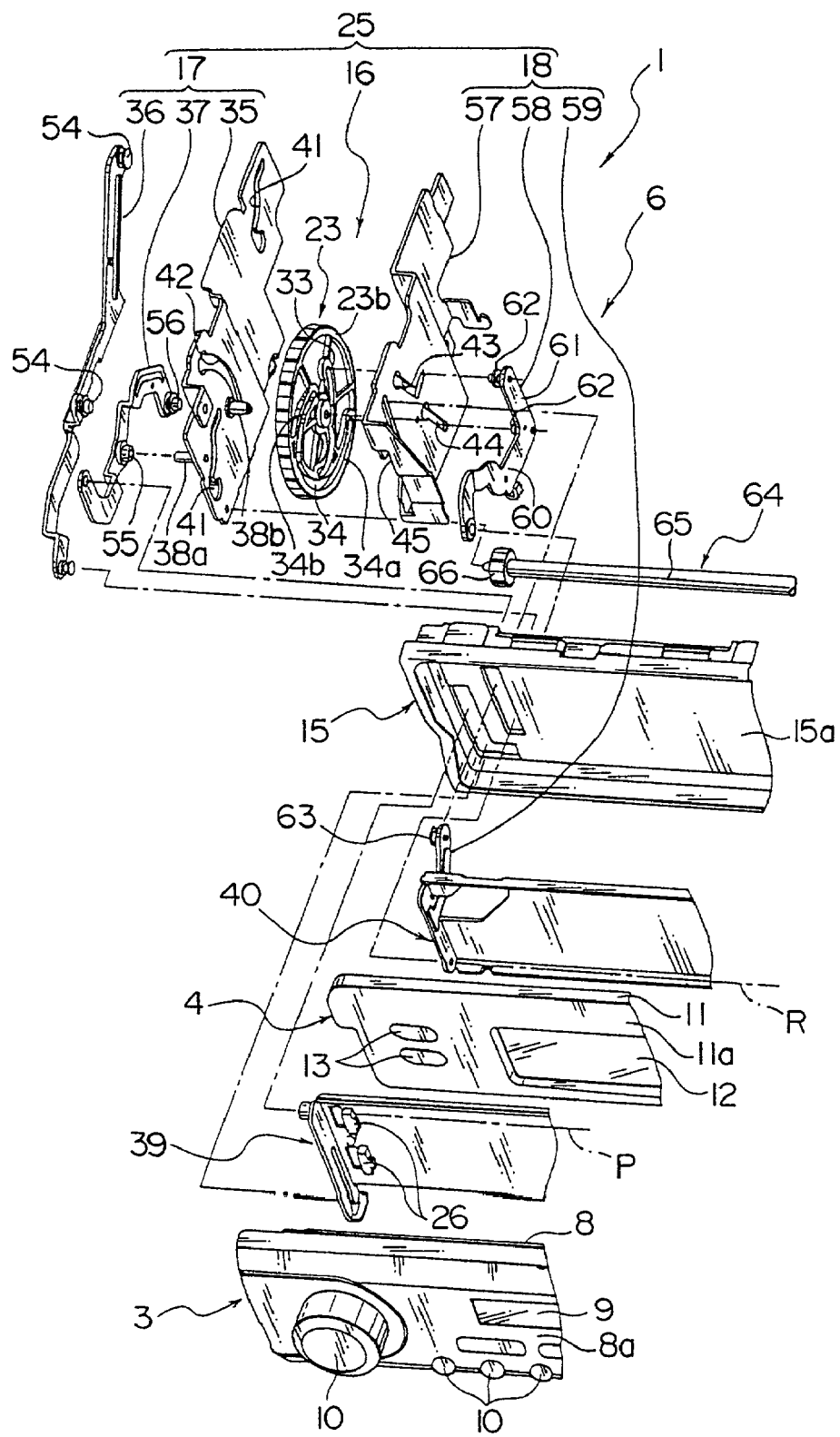
FIG. 5 is a exploded perspective view of a second driving unit of a driving mechanism of an electronic instrument shown in FIG. 1.

As seen from FIGS. 1 to 3, the electronic instrument 1 includes an instrument body 2, a first operation unit 3 serving as a first driven unit, a second operation unit 4 serving as a second driven unit and a driving mechanism 6 (shown in FIGS. 4 and 5). The instrument body 2 includes a chassis 5 shaped like a flat box and an CD player, AM/FM tuner, etc. which are accommodated within the chassis 5. The chassis 5 includes a box-like chassis body 14, a front panel 15 attached to the front side of the chassis 14. The front panel 15 is a belt-like sheet metal.

The front panel 15 has a recording medium inserting slot 7 (shown in FIG. 2) on a plane 15a. The CD is inserted into the instrument body 2 through the slot 7 and is taken out therefrom. The front panel 15 is provided with a plurality of walls which extend upright from all the edges of the plane 15a and are integrally molded. Incidentally, at the first position described later, the first operation unit 3 and second operation unit 4 are accommodated within a space surrounded by the plurality of upright walls 15c. The plane 15a of the front panel 15 constitutes a plane of the instrument body 2 in claims.

The CD player and AM/FM tuner which are accommodated within the chassis 5 operate when the switches 10 and 13 attached to the first operation unit 3 and the second operation unit 4 are pressed by the user.

As seen from FIGS. 1 to 6, FIG. 13 and FIG. 20, the first operation unit 3 includes a flat box-like housing 8, a liquid crystal display (LCD) which serves as a display panel and is accommodated in the housing 8 and various switches 10. The housing 8 has a width and height which are substantially equal to those of the chassis 5 of the instrument body 2.

The LCD 9 has a display plane which is a display area for displaying various items of information for a user. The various switches 10 constitute an operation unit which is operated by the user. The display plane and operation unit are provided on a plane 8a of the housing 8 positioned on this side in FIG. 1. The plane 8a constitutes an exposed plane defined in claims.

For example, the tuning of the broadcasting stations whose radio waves are received by the AM/FM tuner is performed in such a manner that the user operates the switch provided on the first operation unit 3. The information such as the frequency and name of the broadcasting station which is being tuned is displayed on the LCD 9 of the first operation unit 3.

The first operation unit 3 is removable from a first holder 39 (FIGS. 4 and 5) of a driving mechanism.

The first operation unit 3 has grooves (not shown) on both sides of a plane opposite to the exposed plane 8a. The first holder 39 has locking pieces which are to be locked by the grooves. The first operation unit 3 is mounted in the first holder 38 when the locking pieces 26 are locked by the grooves. The first operation unit 3 is dismounted from the first holder 38 when the locking pieces 26 are unlocked from the grooves.

As seen from FIGS. 3 to 5 and FIG. 20, the second operation unit 4 includes a flat box-like housing 11, a liquid crystal display (LCD) which serves as a display panel and is accommodated in the housing 11 and various switches 13. The housing 11 has a width which is slightly smaller than the distance between the opposite upright walls 15c in a width direction of the chassis 5 of the instrument body 2 and a height which is slightly smaller than the distance between the opposite upright walls 15c in a height direction of the chassis 5 of the instrument body 2.

The LCD 12 has a display plane which is a display area for displaying various items of information for a user. The various switches 13 constitute an operation unit which is operated by the user. The display plane and operation unit are provided on a plane 11a of the housing 11 positioned on this side in FIG. 20. The plane 11a constitutes an exposed plane defined in claims.

For example, the tuning of the broadcasting stations whose radio waves are received by the AM/FM tuner is performed in such a manner that the user operates the switch provided on the first operation unit 3. The information such as the frequency and name of the broadcasting station which is being tuned is displayed on the LCD 9 of the first operation unit 3.

For example, the song to be played back by the CD player is selected when the switch 13 provided on the second operation unit 4 is operated by the used. The information such as a track number which is being selected is displayed on the LCD 12 of the second operation unit 4.

The first operation unit 3 and the second operation unit 4 are moved by a driving unit 6 over the first position shown in FIG. 1, third position shown in FIG. 3 and second position shown in FIG. 2. In this embodiment, the first operation unit 3 and the second operation unit 4 are moved by the driving unit 6 in the order of the first position, third position and second position. Further, the first operation unit 3 and the second operation unit 4 are moved by the driving unit 6 in the order of the second position, third position and first position.

At the first position, the first operation unit 3 and the second operation unit 4 are arranged in parallel in a direction perpendicular to the plane 15a of the front panel 15. The second operation unit 4 is located between the first operation unit 3 and the plane 15a. The second operation unit 4 is accommodated within a space surrounded by the upright walls 15c and plane 15a. Incidentally, when the first operation unit 3 and the second operation unit 4 are located at the first position, the exposed planes 8a and 15a are oriented in a direction being not opposite to the plane 15a, concretely in a direction reverse to the direction opposite thereto. The first operation unit 3 covers the exposed plane 11a of the second operation unit 4.

At the third position, both the first operation unit 3 and the second operation unit 4 are moved downward from the first position to expose the recording medium inserting slot 7. The first operation unit 3, when it moves from the first position to the third position, once leaves from the instrument body 2 in a direction perpendicular to the plane 15a of the front panel 15, and thereafter moves downward of the instrument body 2 to the third position. Further, in FIG. 2, the first operation unit 3 rotates toward this side so that the exposed plane 8a is oriented slightly upward.

At the second position, the first operation unit 3 moves further downward from the third position, and also rotates upward so that the display plane of the LCD 9, i.e. exposed plane 8a is oriented more upward. At the second position, the second operation unit 4 moves upward from the third position and also rotates so that the display plane of the LCD 12 is oriented upward. At the second position, both of the operation portions which are constituted by the display plane of the LCD 9 and switches 10 and by the LCD 12 and switches 13 are exposed forward of the plane 15a of the front panel 15.

Specifically, at the second position, the exposed plane 11a of the second operation unit 4 is located above the exposed plane 8a of the first operation unit 3. At the second position, since the exposed plane 8a of the first operation unit 3 and the exposed plane 11a of the second operation unit 4 are both exposed for the user, the user can visually recognize the display planes of both the exposed planes 8a and 11a and operate the corresponding operation units. In addition, since both the exposed planes 8a and 11a of the first operation unit 3 and the second operation unit 4 are oriented upward, the user can satisfactorily perform the above visual recognition and the operation.

The driving mechanism 6 includes a first holder 39 and a second holder 40 which are inner lids, a first driving unit 24 (FIG. 4) and a second driving unit 25 (FIG. 5). The first holder 39 and the second holder 40 are made of a belt-like sheet metal. The first holder 39 and the second holder 40 are arranged so that their longitudinal direction coincides with the width direction of the instrument body 2. The first holder 39 and the second holder 40 are slightly smaller than the front panel 15 in size.

The first operation unit 3 is removable from the first holder 39. The first holder 39, as seen from FIGS. 4, 5 and 8, is provided with four locking pallets 26. These pallets are given two for each of both ends of the plane of the first holder 39. Namely, these pallets are given as two sets each including two pallets. The pallets in each of the sets are apart from each other in the height direction of the instrument body 2. These four locking pallets 26 are urged toward the center of the first holder 39 by torsion springs or the like not shown.

The first operation unit 3 is attached to the first holder 39 by locking the locking pallets 26 into the grooves (not shown) of the first operation unit 3. For example, the locking pallets 26 can be unlocked from the grooves by the moving the first operation unit 3 downward of the first holder 39. Thus, the first operation unit 3 is detached from the first holder 39. The second operation unit 4 is attached to the second holder 40.

The driving units 24 and 25 are arranged within the chassis body 14. The driving units 24 and 25 are arranged apart from each other in a width direction of the instrument body 2. The driving units 24 and 25 are arranged at both ends of the instrument body 2 in the width direction.

Incidentally, the first driving unit 24 and the second driving unit 25 have substantially the same structure. Therefore, the first driving unit 24 will be explained representatively, but the second driving unit 25 with the like reference numerals will not be explained. The first driving unit 24 includes a driving source 16 (FIG. 11), a first driving portion 17 (FIG. 4) and a second driving portion 18 (FIG. 4).

Figure 11:
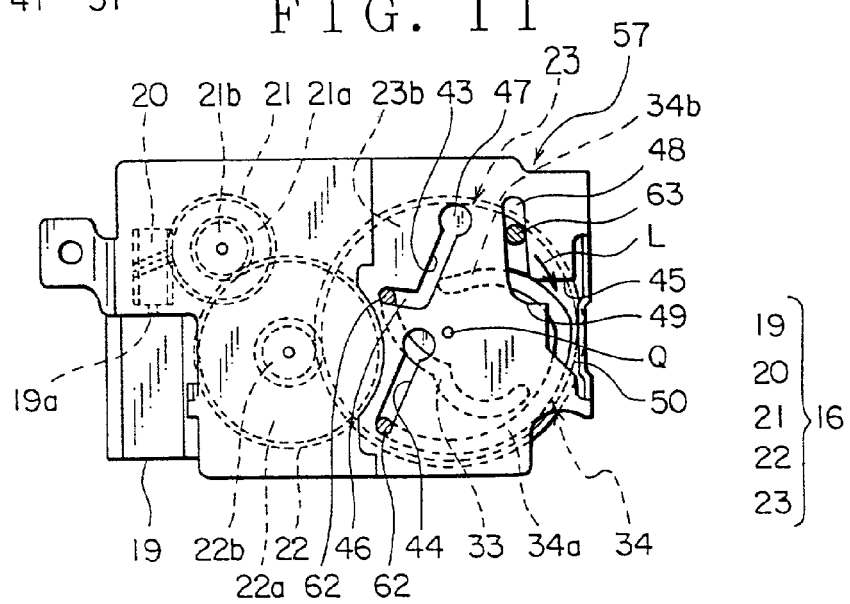
FIG. 11 is a side view of a second frame and a cam gear viewed in a direction of arrow B in FIG. 8 to show the relative positions therebetween.

As shown in FIG. 11, the driving source 16 includes a motor 19, a worm 20, a worm gear 21, a transmission gear 22 and a cam gear 23. The motor 19 is equipped with an output shaft 19a which is rotatable in both normal/reverse directions. The motor 19 is secured to both the first fame 35 (FIG. 9) and second frame 57 (FIG. 11).

The worm 20 is attached to the output shaft 19a of the motor 19. The worm gear 21 includes a large-diameter gear portion 21a and a small-diameter gear portion 21b which are integrated and coaxially arranged. The worm gear 21 is arranged between the first frame 35 and the second frame 57 and rotatably supported by these frames. The large-diameter gear portion 21a of the worm gear 21 is in mesh with the worm 20.

The transmission gear 22 includes a large-diameter gear portion 22a and a small-diameter gear portion 22b which are integrated and coaxially arranged. The transmission gear 22 is arranged between the first frame 35 and the second frame 57 and rotatably supported by these frames. The large-diameter gear portion 22a of the transmission gear 22 is in mesh with the small-diameter gear portion 21b of the worm gear 21.

The cam gear 23 is arranged between the first frame 35 and the second frame 57, and rotatably supported by these frames. The cam gear 23 is mesh with the small-diameter portion 22b of the transmission gear 22.

The rotation center of each of the gears 21, 22 and 23 is in line with the width direction of the instrument body 2. These gears 21, 22 and 23 are arranged so that their both planes are in line with the depth direction of the instrument body 2 shown in FIG. 1 and others. As seen from FIG. 9, a first groove 31 and a second groove 32 are formed in the plane 23a of the cam gear 23 oriented from the inside of the chassis 14 to the outside thereof in the width direction of the instrument body 2.

As seen from FIG. 9, the first groove 31 and the second groove 32 are spirally around the rotating center Q of the cam gear 23. The first groove 31 and the second groove 32 are arranged at the positions and have shapes which are substantially symmetrical to each other with respect to the rotating center Q of the cam gear 23. The first groove 31 and second groove are formed spirally so as to approach the outer edge of the cam gear 23 gradually as they leave from the rotating center Q.

As seen from FIG. 11, the third groove 33 and the fourth 34 are formed in the plane 23b of the cam gear 23 oriented from the outside of the chassis 14 to the inside thereof in the width direction of the instrument body 2.

As seen from FIG. 11, the first groove 33 passes the vicinity of the rotating center Q of the cam gear 23 and travels substantially radially of the cam gear 23. The third groove 33 is slightly curved in a direction of forming an arc around the rotating center Q of the cam gear 23.

As seen from FIG. 11, the second gear 34 includes an arc portion 34a around the rotating center Q of the cam gear 23 and a spiral portion 34b communicating with the arc portion 34a. The arc portion 34a is located at the outer edge of the cam gear 23. The spiral portion 34b extends so as to approach the rotating center of the cam gear 23 gradually as it leaves the arc portion 34a.

In accordance with the configuration described above, by the rotary driving force from the motor 19 in the driving source 16, the cam gear 23 is rotated in both directions of arrow L in FIG. 9 and of arrow M in FIG. 16.

As seen from FIG. 4, the first driving portion 17 includes a first frame 35, a first arm 36 and a second arm 37. The first frame 35 is secured in a state extending upright from the bottom wall of the chassis body 14 toward its inside. The first frame 35 is arranged so that its plane is opposite to the plane 23a of the cam gear 23.

As seen from FIGS. 4, 5 and 9, the first frame 35 includes a pair of first guide holes 41, a second guide hole 42 and supporting pins 38a, 38b. As seen from FIG. 4, the pair of guide holes 41 are arranged apart from each other in a direction from the side end on the side of the front panel 15 to that on the opposite side.

As seen from FIG. 9, the pair of guide holes 41 each includes a horizontally extending segment 51, an arc segment 52 and an downward extending segment 53. These segments are successively arranged in a direction from the inner side of the instrument body 2 from the side of the front panel 15. The horizontally extending segment 51 extends horizontally. The arc segment 52 communicates to the horizontally extending segment 51 and has an arc in a plane shape. The downward extending segment 53 communicates to the arc segment 52 and extends downward from the arc segment 52.

The second guide hole 42 has an arc around a supporting pin 38a in a plane shape. The supporting pin 38a is located on the side of the front panel 15 of the first frame 35. The supporting pin 38a extends upright from the first frame 35. The supporting pin 38a extends from the first frame 35 in a width direction of the instrument body 2 from the inside of the chassis body 14 to the outside thereof.

As seen from FIG. 5, a supporting pin 38b extends from the first frame 35. The supporting pin 38b extends from the first frame 35 in a width direction of the instrument body 2 from the outside of the chassis body 14 to the inside thereof. The supporting pin 38b is passed through the rotating center Q of the cam gear 23 so as to support it rotatably.

The first arm 36 is formed in an arm shape so as to extend from the side of the front panel 15 of the instrument body 2 to the inner side thereof. The first arm 36 is arranged on the side of the first frame 35 where the supporting pin 35 extends upright. The first arm 36 supports the lower end of the first holder 39 by its one end on the side of the front panel 15. The first arm 36 rotatably supports the lower end of the first holder 39 in the width direction of the instrument body 2. The first arm 36 slidably supports the first holder in the height direction of the instrument body 2.

The first arm 36 is equipped with driving pins 54 at both the center and other end. The driving pins 54 each extends upright from the first arm 36 toward the first frame 35. When the first arm 36 is arranged on the side of the first frame 35 where the supporting pins 38a extend upright, these driving pins 54 are inserted into the pair of first guide holes 41, respectively. The driving pin 54 provided at the center of the first arm 36 is inserted in the first groove 31 of the cam gear 23.

Figure 10:
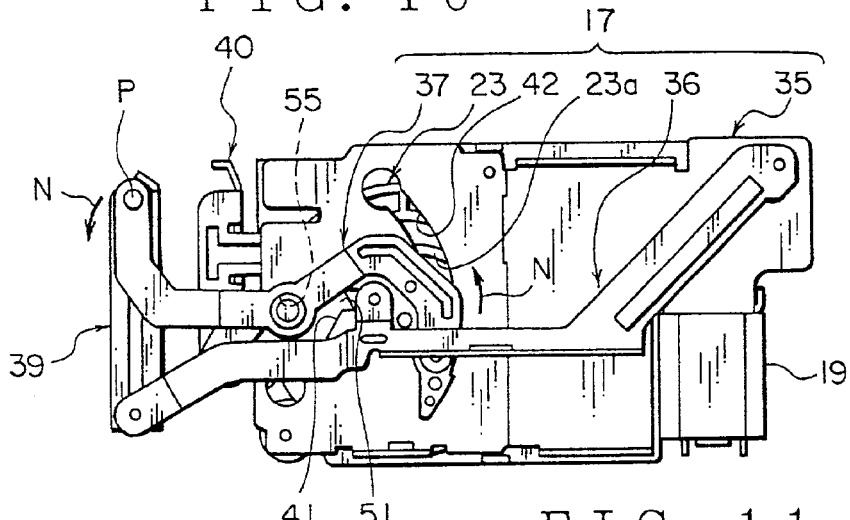
FIG. 10 is a side view of a first arm and a second arm viewed in a direction of arrow A in FIG. 8 to show the relative positions therebetween.

As seen from FIGS. 4 and 10, the second arm 37 is formed in an arm shape so as to extend from the side of the front panel 15 of the instrument body 2 to the inner side thereof. The second arm 37 is arranged between the first frame 35 and the first arm 36 in the width direction of the instrument body 2 and above the first arm 36. The second arm 37 supports the upper end of the first holder 39 by its one end on the side of the front panel 15. The second arm 37 rotatably support the upper end of the first holder 39 around the first rotating center P (indicated by one-dot chain line in FIG. 4) in the width direction of the instrument body 2.

The second arm 37 has a through-hole 55 made at its center. The supporting pin 38a is inserted into the through-hole 55. The second arm 37 is rotatably supported by the supporting pin 38a around itself and the through-hole 55. The second arm 37 is equipped with a driving pin 56 at the other end.

The driving pin 56 extends upright from the outside of the chassis body 14 to the inside thereof in the width direction of the instrument body 2. When the second arm 37 is located between the first frame 35 and the first arm 36 and also above the first arm 36, the driving pin 56 is inserted into the second guide hole 42 and the second groove 32 of the cam gear 23.

As shown in FIG. 4, the second driving portion 18 includes a second frame 57, a third arm 58 and a supporting arm 59. The second frame 57 is secured in a state extended upright from the bottom wall of the chassis body 14 to the inside thereof. The second frame 57 is arranged so that its plane is opposite to the plane 23b of the cam gear 23b. The second frame 57 and the first frame 35 sandwiches the gears 21, 22 and 23 therebetween.

As seen from FIG. 11, the second frame 57 includes a third guide hole 43, a fourth guide hole 44 and a supporting hole 45. The third guide hole 43 and fourth guide hole 44 are vertically arranged so that the former is located above the latter.

The third guide hole 43 includes an arc segment 46 and a slope segment 47. The arc segment 47 is located centrally in the second frame 57 and formed in an arc shape so as to extend from the side of the front panel 15 of the instrument body 2 toward the inner side thereof. The slope segment 47 communicates to the end of the arc segment 46 on the side of the front panel 15. The slope segment 47 extends upward from the arm segment 46 and slopes to form an obtuse angle with the arc segment 46 as it leaves from the arc segment 46.

The fourth guide hole 44 extends upward from the vicinity of the second frame 57 and slopes so as to be in parallel to the slope segment 47.

The supporting hole 45 is provided at the end of the second frame 57 on the side of the front panel 15. The supporting hole 45 includes a first vertical segment 48, a horizontal segment 49 and a second vertical segment 50. These segments are successively arranged in a direction from the center of the second frame 57 to the end on the side of the front panel 15 thereof.

The first vertical segment 48 extends from the upper end of the second frame 57 to the center of the second frame 57 substantially vertically. The first vertical segment 48 slightly slopes so as to approach the third guide hole 43 as it extends upward. The horizontal segment 49 communicates to the lower end of the first vertical segment 48. The second vertical segment 50 communicates to the end of horizontal segment 49 on the side of the front panel 15. The second vertical segment 50 extends downward from the horizontal segment 49. The second vertical segment 50 is opened against the edge of the second frame 57 on the side of the front panel 15.

The third arm 58 is arranged on the more inner side of the chassis body 14 than the second frame 57 in the width direction of the instrument body 2. The third arm 58 integrally includes an arm segment 60 which extends from the side of the front panel 15 of the instrument body 2 and a vertical segment 61 which extends vertically.

The arm segment 60 supports the lower end of the second holder 40 by the one end on the side of the front panel 15. The arm segment 60 rotatably supports the lower end of the second holder 40 around the second rotating center R (indicated by one-dot chain line in FIG. 4) in the width direction of the instrument body 2. The vertical segment 61 communicates to the other end of the arm segment 60 and extends upward therefrom.

The third arm 58 is equipped with driving pins 62, 62 at both ends of the vertical segment 61, respectively. The driving pins 62, 62 extend upright from the third arm 58. The driving pins 62, 62 extend from the third arm 58 from the inside of the chassis body 14 to the outside thereof in the width direction of the instrument body 2. When the third arm 58 is arranged on the more inner side of the chassis body 14 than the second frame 57, the driving pins 62, 62 are inserted into the third guide hole 43 and the fourth guide hole 44, respectively. The driving pins 62, 62 are inserted into the third groove 33 and fourth groove 34 of the cam gear 23, respectively.

The supporting arm 59 is formed integrally to the second holder 40. The supporting arm 59 is formed in an arc shape when it is viewed from the side of the instrument body 2. The supporting arm 59 extends from the side upper end of the second holder 40 toward the inner side of the instrument body 2. The supporting arm 59 is arranged on the more inner side of the chassis body 14 than the second frame 57 in the width direction of the instrument body 2.

The supporting arm 59 is equipped with a supporting pin 63 on the end on the side apart from the second holder 40. The supporting pin 63 extends upright from the supporting pin 59. The supporting pin 63 extends from the inside of the chassis body 14 to the outside thereof in the width direction of the instrument body 2. When the supporting arm 59 is arranged on the more inner side of the chassis 14 than the second frame 57, the supporting pin 63 is inserted into the supporting hole 45.

The first driving unit 24 having the configuration as described above, when the motor 19 rotates the cam gear 23 by e.g. normal rotation, moves the first operation unit 3 and the second operation unit 4 from the above first position to the third position through the second position.

The second driving unit 25 has the same configuration as that of the first driving unit 24 except that it does not include the motor 19, worm 20, worm gear 21 and transmission gear 22. As seen from FIGS. 4 and 5, the first driving gear 24 and the second driving gear 25 are linked with each other via a link rod 64.

The link rod 64 is supported by the chassis 14 so that is can rotate around its shaft. The link rod 64 integrally includes a rod body 65 and link gears 65 on its both ends. The ling gear 66 is in mesh with the cam gear 23 of the first driving unit 24 and the cam gear 23 of the second driving unit 25. Therefore, by the rotary driving force of the motor 19 of the first driving unit 24, the cam gears 23 of the first driving unit 24 and the second driving unit 25 are rotated.

An explanation will be given of the operation of the driving mechanism 6 having the configuration described above. First, at the first position, as seen from FIGS. 9 and 10, the two driving pins 54 of the first arm 36 are located at the ends on the inner side of the instrument body 2 of the horizontally extending segments 51 of each of the first guide holes 41 of the first frame 35. Of the two driving pins 54, the driving pin 54 at the center of the first arm 36 is located at the end of the first groove 31 on the rotary center Q of the cam gear 23.

The driving pin 56 of the second arms 37 is located at the lower end of the second guide hole 43 of the first frame 35. The driving pin 56 is located at the end of the second groove 32 on the side of the rotary center Q of the cam gear 23.

Further, at the first position, as seen from FIGS. 11 and 12, the driving pin (hereinafter referred to as an upper driving pin) at the upper end of the-vertical segment 61 of the third arm 58 is located at the end of the arc segment 46 of the third guide hole 43 of the second frame 57 on the inner side of the instrument body 2. The upper driving pin 62 is located at the end of the third groove 33 of the cam gear 23 on the inner side of the instrument body 2.

The driving pin 62 (hereinafter referred to as a lower driving pin) at the lower end of the vertical segment 61 is located at the end of the arc segment 34a of the fourth groove 34 on the side apart from the spiral segment 34b. The lower driving pin 62 is located at the lower end of the fourth guide hole 44. The supporting pin 63 of the supporting arm 59 is located at the upper end of the first vertical segment 48 of the supporting hole 45 of the second frame 57.

Thus, as seen from FIGS. 6 and 7, the respective exposed planes 8a and 11a of the first operation unit 3 and second operation unit 4 are in parallel in a direction perpendicular to the plane 15a of the front panel 15. The exposed plane 11a is located between the first operation unit 3 and the front panel 15. Namely, the second operation unit 4 is covered with the front panel 15 and the first operation unit 3. Further, as seen from FIG. 8, the first holder 39 and the second holder 40 are arranged in parallel so that the former stands in front of the latter in FIG. 8.

When the motor 19 makes e.g. normal rotation so that the cam 23 rotates in a direction of arrow L in FIGS. 9 and 11, the driving pin 54 is urged to move toward the outer edge of the cam gear 23 because the first groove 31 is formed spirally so as to approach the outer edge of the cam gear 23 gradually as it leaves from the rotating center Q, and the driving pin 54 is situated at the end of the first groove 31 on the side of the rotary center Q. Then, the driving pin 54 moves along the horizontally extending segment 51 of the first guide hole 41 and moves downward along the arc segment 52.

The driving pin 56 is urged to move toward the outer edge of the cam gear 23 because the second groove 32 is formed spirally so as to approach the outer edge of the cam gear 23 gradually as it leaves from the rotating center of the cam gear 23, and the driving pin 56 is situated at the end of the second groove 32 on the side of the rotary center Q. Then, the driving pin 54 moves upward along the second guide hole 42 and the second arm 37 rotates along arrow N in FIG. 10.

After the first holder 39, i.e. first operation unit 3 has moved so as to leave from the instrument panel 2 in a direction perpendicular to the plane 15a of the front panel 15, it moves downward from the instrument body 2. Further, the first operation unit 3 rotates around the first rotary center P so that the exposed plane 8a is oriented upward.

At the first position, when the motor 19 makes e.g. normal rotation so that the cam 23 rotates along arrow L in FIGS. 9 and 11, the lower driving pin 62 remains at the lower end of the fourth guide hole 44 while the upper driving pin 62 moves in the arc segment 46 to the end of the front panel 15 around the lower driving pin 62. This is because the lower driving pin 62 of the third arm 58 is located in the arc segment 34a of the fourth groove 34 and the upper pin 62 is located in the arc segment 46 of the third guide groove 43.

Figure 12:
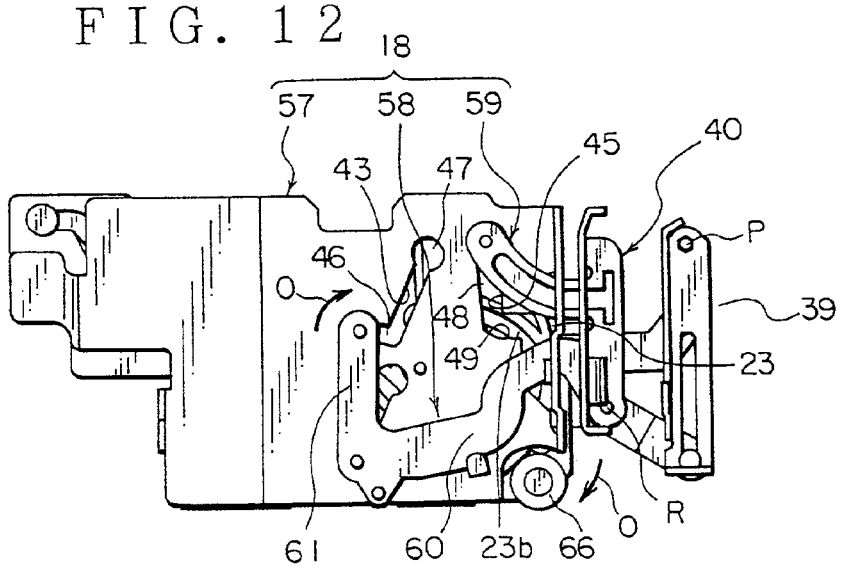
FIG. 12 is a side view of a second arm, a third arm and a supporting arm viewed in a direction of arrow B in FIG. 8 to show the relative positions among them.

The third arm 58 rotates around the lower driving pin 62 in a direction of arrow O (FIG. 12). The second holder 40, i.e. second operation unit 4 moves downward along the length of the arc segment 46. Then, the supporting pin 63 of the supporting arm 59 moves downward within the first vertical segment 48.

In this way, as seen from FIGS. 13 and 14, the first operation unit 3 and first holder 39 leave in a direction perpendicular to the plane 15a of the front panel 15 and slides downward from the instrument body 2 so that the exposed plane 8a is oriented upward. The second operation unit 4, as seen from FIGS. 13 and 14, moves downward to expose the recording medium inserting slot 7. Thus, the first operation unit 3 and second operation unit 4 move from the first position to the third position.

Figure 17:
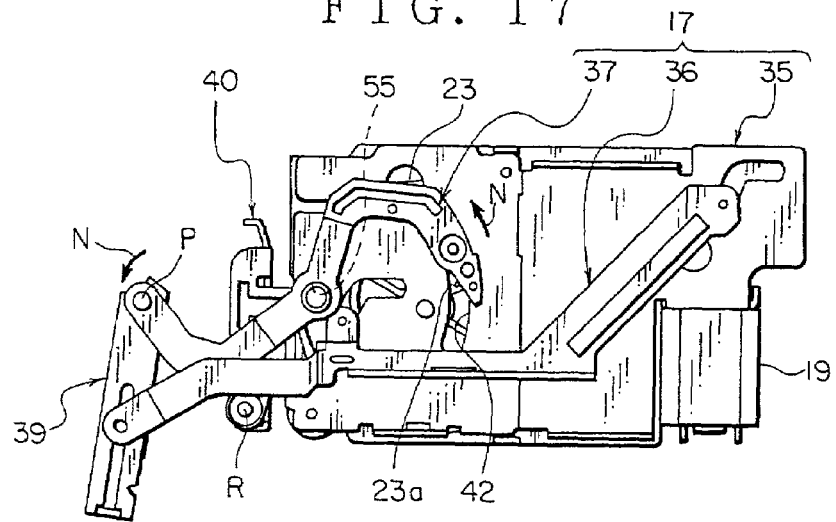
FIG. 17 is a side view of the first frame, first arm and second arm viewed in a direction of arrow C in FIG. 15 to shown the relative positions among them.

At the third position, as seen from FIGS. 16 and 17, two pins 54 of the first arm 36 are situated at the centers of the arc segments 52 of the pair of first guide holes 41 of the first frame 35. The driving pin 54 at the center of the first arm 36 is situated at the center of the first groove 31.

The driving pin 56 of the second arm 37 is situated at the center of the second groove 56.

Figure 18:
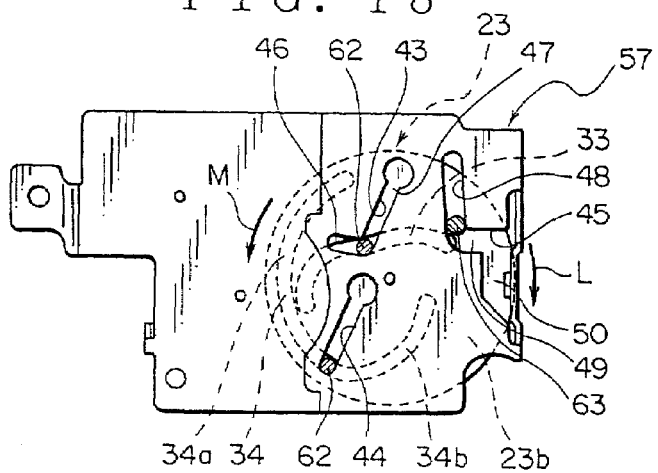
FIG. 18 is a side view of the second frame and cam gear viewed in a direction of arrow D in FIG. 15 to shown the relative positions therebetween.
Figure 19:
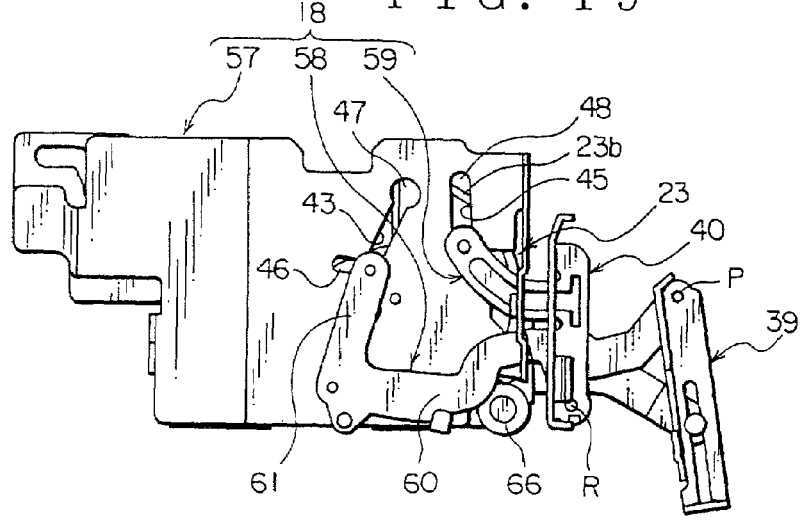
FIG. 19 is a side view of the second frame, third arm and supporting arm viewed in a direction of arrow C in FIG. 15 to shown the relative positions among them.

At the third position, as seen from FIGS. 18 and 19, the upper driving pin 62 of the third arm 58 is situated at the end of the arc segment 46 of the third guide hole 43 of the second frame 57 on the side of the front panel 15. The upper driving pin 62 is situated at the center of the third groove of the cam gear 23.

The lower driving pin 62 is situated the end of the arc segment 34a of the fourth groove 34 on the side of the spiral portion 34b. The lower driving pin 62 is situated at the lower end of the fourth guide hole 44. The supporting pin 63 of the supporting arm 59 is situated at the lower end of the first vertical segment 48 of the supporting hole 45 of the second frame 57.

In this way, as seen from FIGS. 13 and 14, the first operation unit 3 and the second operation unit 4 move downward from the first position, respectively to expose the recording medium inserting slot 7. At this time, the exposed plane 8a of the first operation unit 3 is exposed for the user. The exposed plane Lila of the second operation unit 4 is partially covered with the first operation unit 3.

Figure 15:
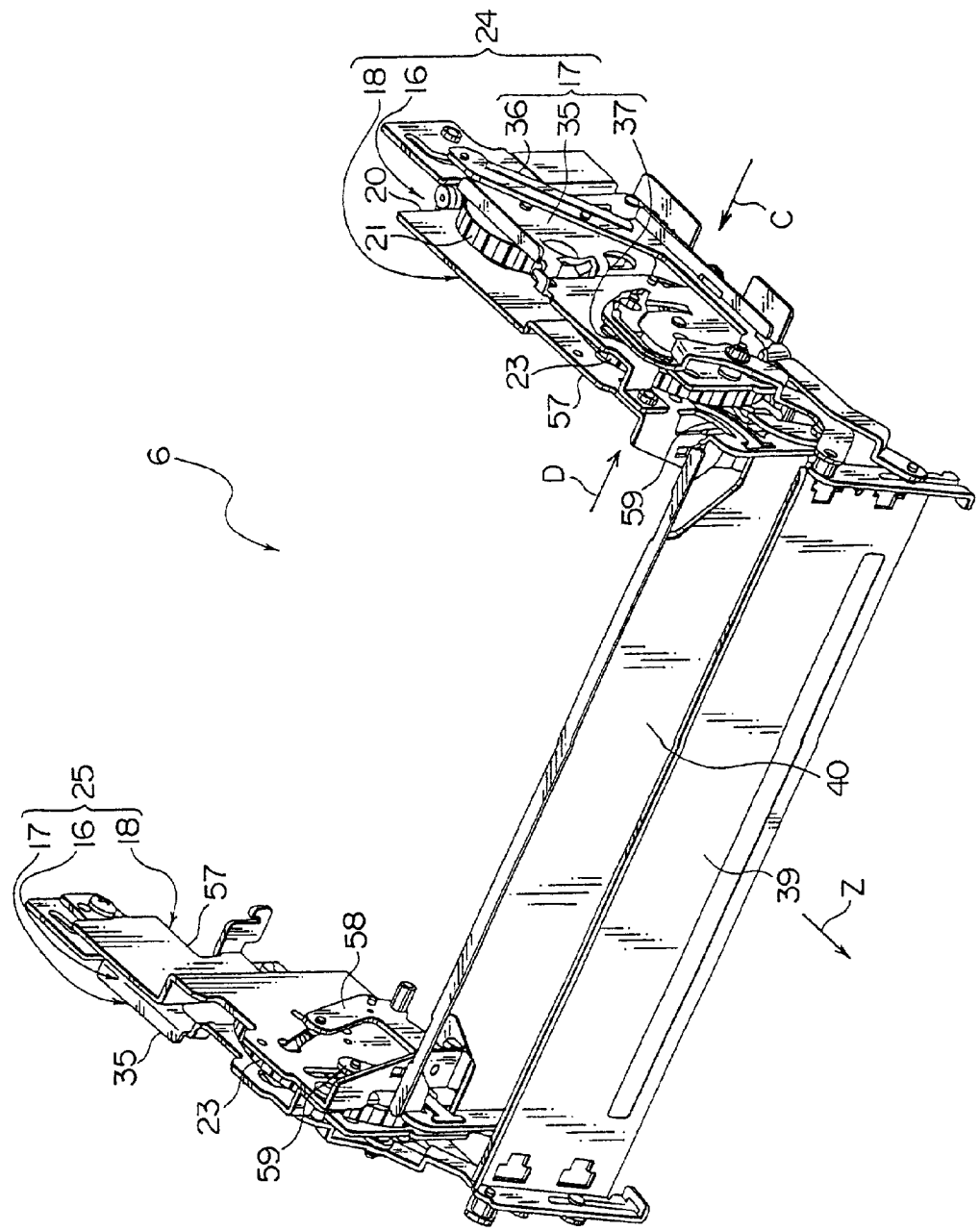
FIG. 15 is a perspective view of the driving mechanism when the first holder and second holder of the electronic instrument have moved to the third position.

Further, as seen from FIG. 15, the first holder 39 and the second holder 40 move downward from the first position, respectively, and the former is located in a lower level than the latter.

The first groove 31 is formed spirally so that it gradually approaches the outer edge as it leaves from the rotating center Q of the cam gear 23 and the driving pin 54 is located at the center of the first groove 31. Owing to this, when the motor 19 makes the normal driving so that the cam gear 23 rotates in a direction of arrow L in FIGS. 16 and 18, the driving pin 54 is urged to move toward the outer edge of the cam gear. Then, the driving pin 54 moves downward along the arc segment 52.

The second groove 32 is formed spirally so that it gradually approaches the outer edge as it leaves from the rotating center Q of the cam gear 23 and the driving pin 56 is located at the center of the first groove 31. Owing to this, the driving pin 56 is urged to move toward the outer edge of the cam gear 23. Then, the driving pin 56 moves further upward along the guide hole 42. The second arm 37 also rotates in an direction of arrow in FIG. 17.

In this way, from the third position, the first holder 39, i.e. The first operation unit 3 leaves further downward from the instrument body 2 and also forward thereof. Since the first arm 36 further moves forward of the instrument body 2 and the second arm 37 rotates in the direction of arrow N, the exposed plane 8a rotates around the first rotary center P so that it is further oriented upward.

The lower driving pin 62 of the third arm 58 is situated at the end of the arc segment 34a on the side of the spiral segment 34b of the groove 34. For this reason, at the third position, when the motor 19 makes the normal driving so that the cam gear 23 rotates in the direction of arrow L in FIGS. 16 and 18, the driving pins 62 of the third arm 58 move upward along the slope segment 47 of the third guide hole 43 and the fourth guide hole 44, respectively.

The third arm 58 moves upward while it moves forward along the slope segment 47 of the third guide hole 43 and the fourth guide hole 44. The supporting pin 63 of the supporting arm 59 moves upward in the first vertical segment 48.

Further, the slope segment 47 of the third guide hole 43 and the fourth guide hole 44 slope at their upper portion so as to approach the first vertical segment 48 gradually. The first vertical segment 48 slopes at its upper portion so as to approach the third guide hole 43. When the lower end of the second holder 40 moves forward of the instrument body 2 and the upper end of the second holder 40 moves toward the front panel 15, the second operation unit 4 rotates around the rotating center R so that the exposed plane 11a is further oriented upward.

In this way, from the third position, as seen from FIGS. 20 and 21, the first operation unit 3 and first holder 39 move forward of and downward from the instrument body 2 so that the exposed plane 8a is oriented slightly upward. The second operation unit 4 moves forward of the instrument body 2 so that the exposed plane 11a is oriented slightly upward. Thus, the first operation unit 3 and the second operation unit 4 move from the third position to the second position.

Figure 24:
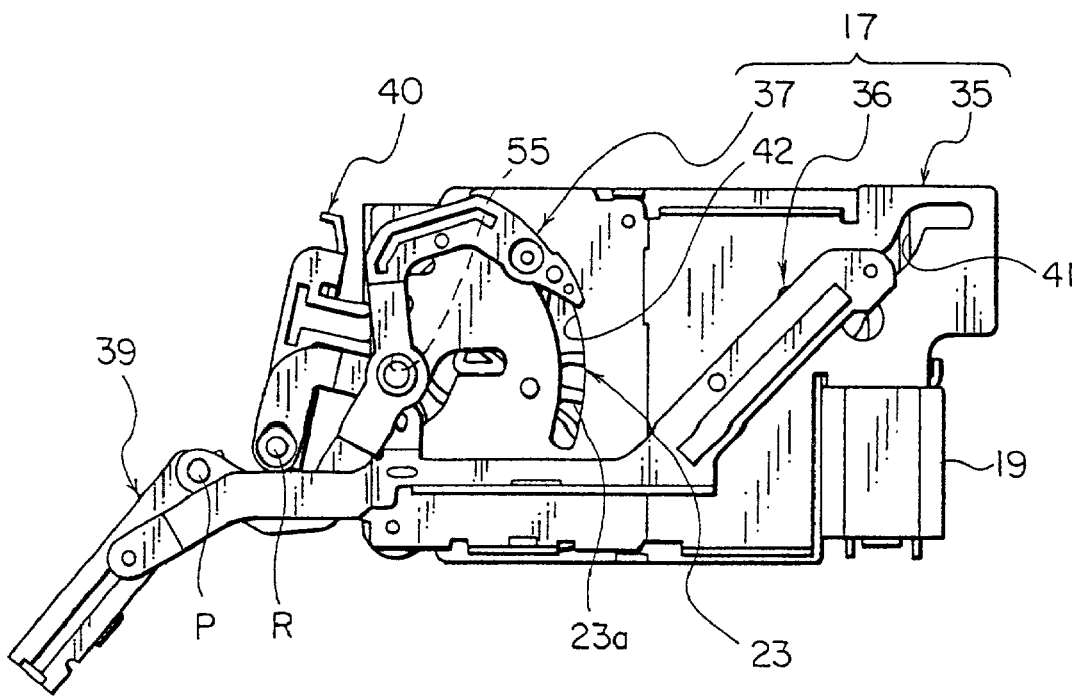
FIG. 24 is a side view of the first frame, first arm and second arm viewed in a direction of arrow E to show the relative positions among them.

At the second position, as seen from FIGS. 23 and 24, the two driving pins 54 of the first arm 36 are situated at the ends of the arc segments 52 of the pair of first guide holes 41 of the first frame 35 on the side of the downward extending segments 53. The driving pin 54 provided at the center of the first arm 36 is situated at the end of the first groove 31 apart from the rotating center Q of the cam gear 23.

The driving pin 56 of the second arm 37 is situated at the upper end of the second guide hole 42. The driving pin 56 is situated at the end of the second groove 32 apart from the rotating center Q of the cam gear 23.

Figure 25:
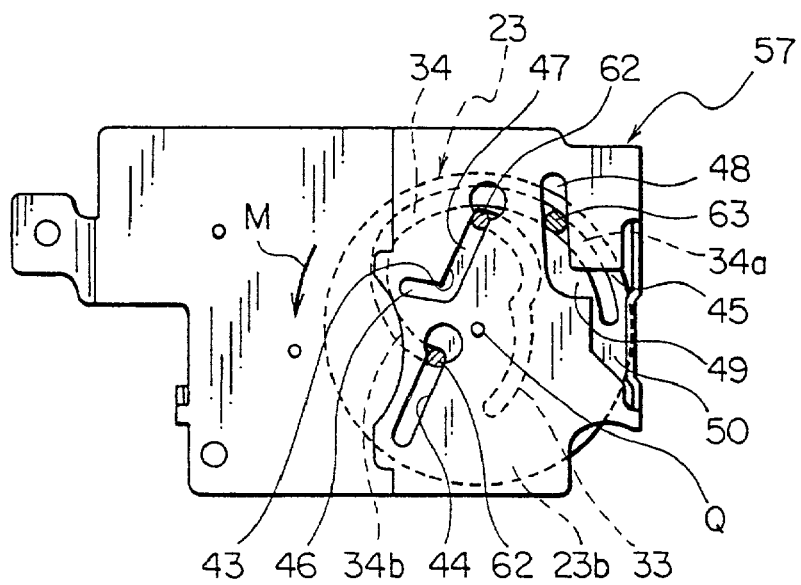
FIG. 25 is a side view of the second frame and cam gear viewed in a direction of arrow F in FIG. 22.
Figure 26:
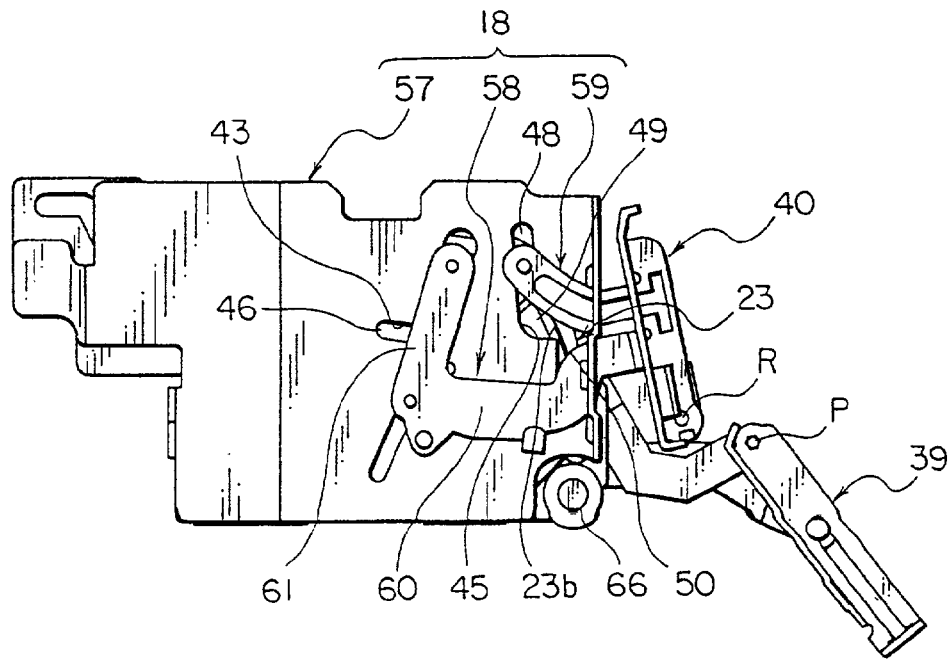
FIG. 26 is a side view of the second arm, third arm and supporting arm viewed in a direction of arrow F in FIG. 22.

At the second position, as seen from FIGS. 25 and 26, the upper driving pin 62 of the third arm 58 is situated at the upper end of the slope 47 of the third guide hole 43 of the second frame 57. The lower driving pin 62 is situated at the end of the spiral segment 34b of the fourth groove 34 on the side of the rotating center Q of the cam gear 23. The lower driving pin 62 is situated at the upper end of the fourth guide hole 44. The supporting pin 63 of the supporting arm 59 is situated at the first vertical segment 48 of the supporting hole 45 of the second frame 57.

In this way, as seen from FIGS. 20 and 21, the first operation unit 3 moves further downward from the third position, while the second operation unit 4 moves upward from the third position. In this case, the first operation unit 3 and the second operation unit 4 rotate so that both the exposed planes 8a and 11a are oriented upward. Thus, the exposed planes 8a and 11a are exposed upward for the user so that the display planes of the LCDs 9 and 12 can be seen satisfactorily by the user.

Figure 22:
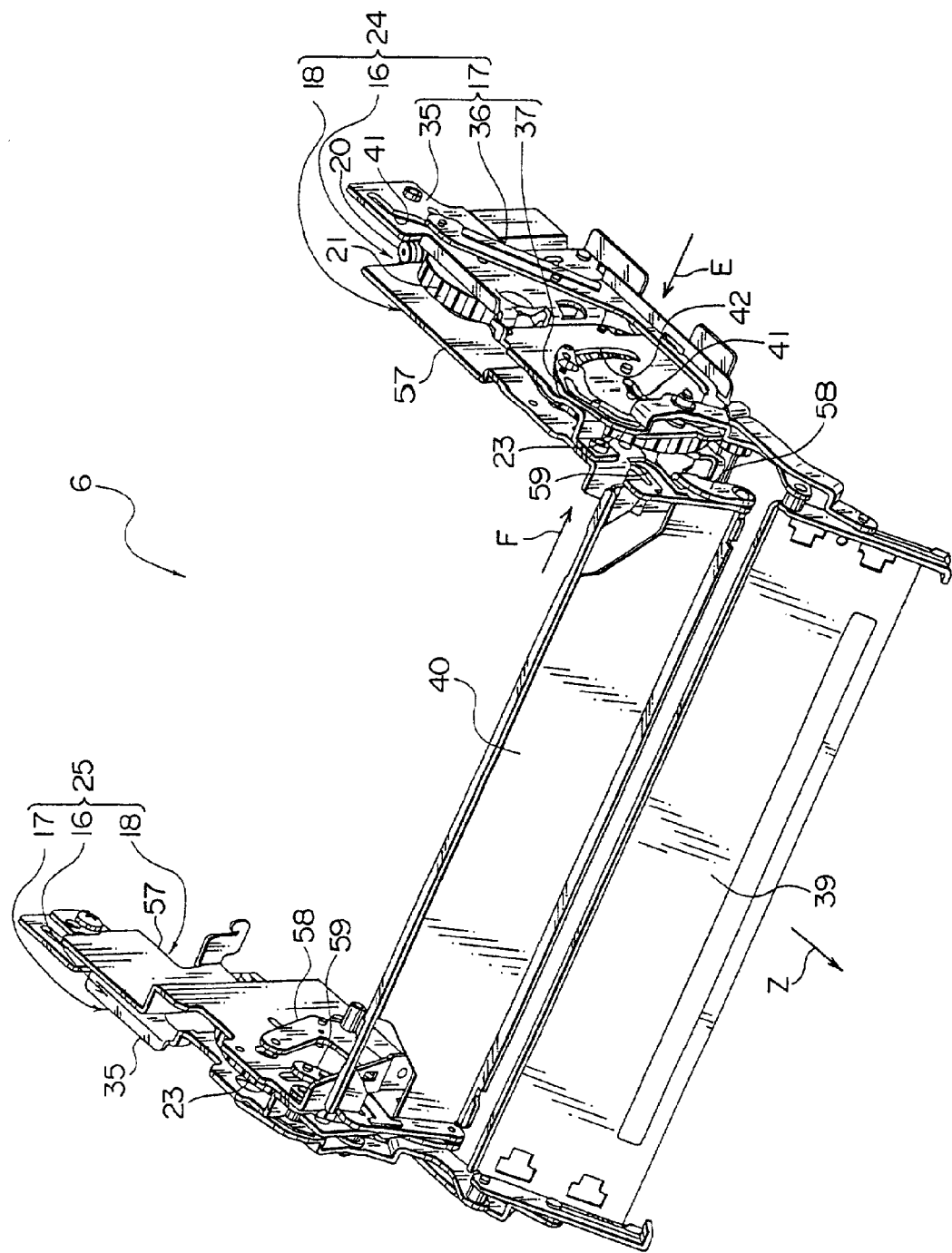
FIG. 22 is a perspective view of the driving mechanism when the first holder and second holder of the electronic instrument shown in FIG. 1.

Further, as seen from FIG. 22, the first holder 39 moves further downward from the third position while the second holder 40 moves upward from the third position. Thus, the first holder 39 is situated at a lower position than the second holder 40.

Where the first operation unit 3 and the second operation unit 4 are moved from the second position to the first position via the third position, the cam gear 23 may be rotated in the direction of arrow M in FIGS. 16, 18, 23 and 25 which is opposite to that of arrow L by rotating the motor 19 to make the reverse driving.

In this way, the first operation unit 3 and the second operation unit 4 move between the first position and the second position with respect to the instrument body 2. These units 3 and 4 can also move to the third position where the recording medium insertion slot 7 is exposed.

The first holder 39, i.e. the first operation unit 3 leaves downward from the instrument body 2 so that it moves from the first position to the second position. The second holder 40, i.e. the second operation unit 4 moves downward relatively to the instrument body 2 to reach the third position and moves upward again to reach the second position.

At the second position, the first holder 39, i.e. the first operation unit 3 rotates around the first rotating center P in a width direction of the instrument body 2 so that the exposed plane 8a is oriented upward. Likewise, at the second position, the second holder 40, i.e. the second operation unit 4 rotates around the second rotating center R in a width direction of the instrument body 2 so that the exposed plane 11a is oriented upward.

Concerning the electronic instrument 1 described above, when the first operation unit 3 is detached form the first holder 39 at the second position or third position, the motor 19 makes the reverse driving as described above so that the cam gear 23 is rotated in the direction of arrow M indicated by FIGS. 16, 18, 23 and 25. Then, the first holder 39 and the second operation unit 4 move toward the first position. Thus, the second operation unit 4 is situated between the first holder 39 and the plane 15a of the front panel 15, and the first holder 39 and the second operation unit 4 are arranged in a direction perpendicular to the plane 15a of the front panel 15. Further, when the first operation unit 3 is detached from the first holder 39, the first holder 39 as well as the front panel 15 covers the second operation unit 4 so that the electronic instrument 1 itself becomes inactive.

In accordance with this embodiment, at the second position, the respective exposed planes 8a and 11a of the first operation unit 3 and the second operation unit 4 are exposed. For this reason, the respective display areas of the LCDs 9 and 12 provided on the exposed planes 8a and 11a can be increased. Thus, the user can satisfactorily visually recognize the operating status of the electronic instrument 1.

On the first operation unit 3, switches 10 for performing the operation such as the selection of the broadcasting station to be received by an AM/FM tuner are provided. On the second operation unit 4, switches 13 for performing the operation such as the selection of the song to be played back by a CD player are provided. In this way, the area where the operating portions are provided is increased and hence can be efficiently used.

Further, the first operation unit 3 and the second operation unit 4 are individually moved relatively to the instrument body 2. Thus, the displacement of the first operation unit 3 and the second operation unit 4 from the instrument body 2 from the first position to the second position where the exposed planes 8a and 11a are exposed can be minimized. Therefore, where the electronic instrument 1 is attached to the instrument panel, interference of the first operation unit 3 and the second operation unit 4 with the instrument such as a gear lever of a vehicle can be prevented.

The first operation 3 and the second operation 4 can be moved to the third position where the recording medium inserting slot is exposed. Therefore, a recording medium such as CD can be surely inserted into the instrument body 2.

The first operation unit 3 can be moved from the first position to the second position so that it leaves downward from the instrument body 2. Therefore, at the second position, the exposed planes 8a and 11a do not overlap each other so that the user can surely visually recognize the exposed planes 8a and 11a, and hence the LCDs 9 and 12 provided thereon.

The first operation unit 3 and the second operation unit can be moved from the first position to the second position so that they leave downward from the instrument body 2. Therefore, at the third position, the recording medium inserting slot can be opened or exposed surely. Thus, the electronic appliance 1 can be surely inserted into the instrument body 2 through the recording medium inserting slot 7.

At the second position, the exposed plane 8a of the first operation unit 3 can be oriented upward. The LCD 9 provided on the exposed plane 8a is made opposite to the user. Thus, the user can easily visually recognize the information displayed on the LCD 9.

At the second position, the exposed plane 11a of the second operation unit 4 can be oriented upward. The LCD 12 provided on the exposed plane 11a is made opposite to the user. Thus, the user can easily visually recognize the information displayed on the LCD 12.

When the first holder 39 is detached from the first holder 39, both the first holder 39 and the second operation unit 4 move so that the second operation unit 4 is situated between the first holder 39 and the instrument body 2. Therefore, when the first operation unit 3 is detached, the first holder 39 covers the second operation unit 4.

When the first operation unit 3 is detached from the first holder 39, the electronic instrument 1 itself cannot operate. This is effective to prevent burglaries.

In the embodiments described above, during movement from the first position to the second position, while the first operation unit 3 moves downward, the second operation unit 4 stands at the third position and thereafter moves upward. However, in accordance with this invention, after the first operation unit 3 has reached a bottom dead point during movement from the first position to the second position, the second operation unit 4 may move upward.

In this case, at the second position, it is possible to prevent the exposed plane 8a of the first operation unit 3 and the exposed plane 11a of the second operation unit 4 from overlapping each other. Therefore, at the second position, the user can satisfactorily visually recognize the exposed planes. The user can more surely visually recognize the displayed contents of the LCDs 9 and 12 provided on the exposed planes 8a and 11a, respectively, and more surely operate the switches 10 and 13.

Figure 27:
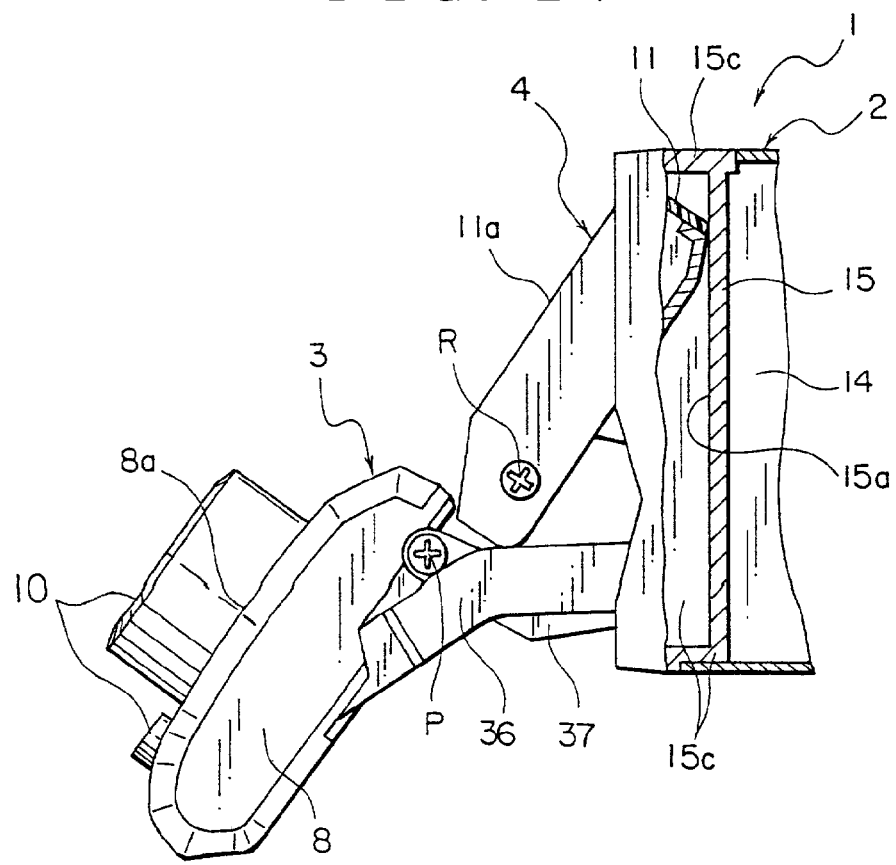
FIG. 27 is a side view of an electronic instrument when the first operation unit and the second operation unit thereof have moved to the second position according to a modification of this invention.

Further, in the embodiments described above, at the second position, both the first operation unit 3 and the second operation unit 4 rotate so that the exposed planes 8a and 11a are oriented upward. However, in accordance with this invention, by appropriately changing the length of each of the arms 36, 37, 58 and 59, at the second position, as seen from FIG. 27, the exposed planes 8a and 11a can be made in parallel to each other. In FIG. 27, like reference numerals refer to like parts in the embodiment described above. In this case, at the second position, the user can visually recognize the displayed information of the LCDs 9 and 12 provided on the exposed planes 8a and 11a.

Further, in accordance with this invention, by appropriately changing the length of each of the arms 37, 38, 58, 59, as seen from FIG. 29, at the first position, the exposed planes 8a and 11a may be made opposite to each other. In FIG. 29, like reference numerals refer to like parts in the embodiments described above.

Figure 31:
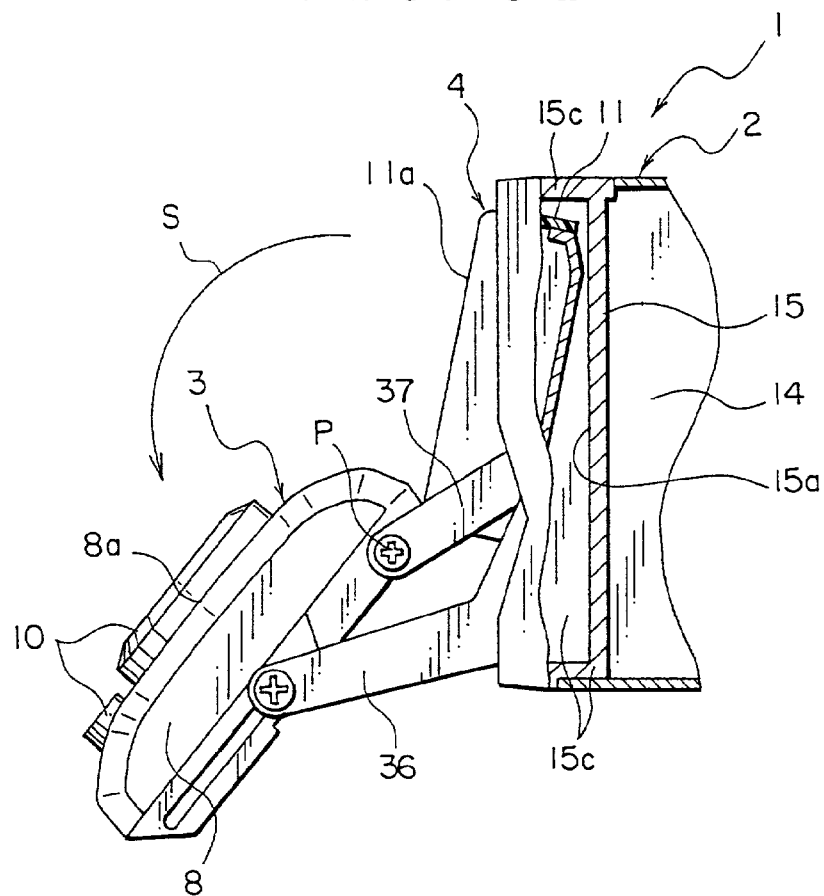
FIG. 31 is a side view of an electronic instrument shown in FIG. 28 partially in section when the first operation unit and the second operation unit have moved to the second position.
Figure 32:
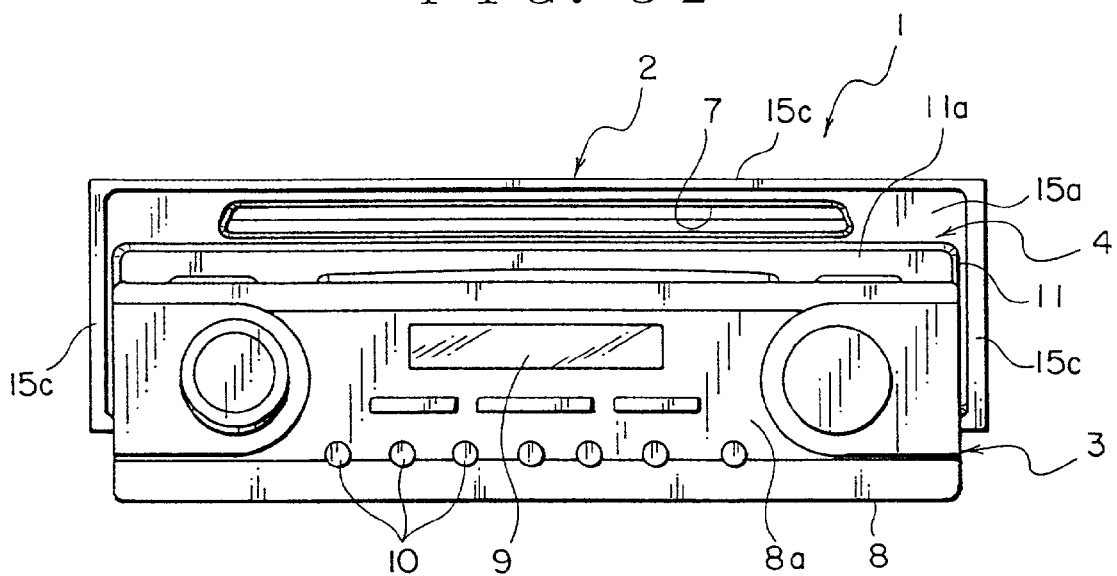
FIG. 32 is a side view of an electronic instrument shown in FIG. 28 partially in section when the first operation unit and the second operation unit have moved to the third position.
Figure 33:
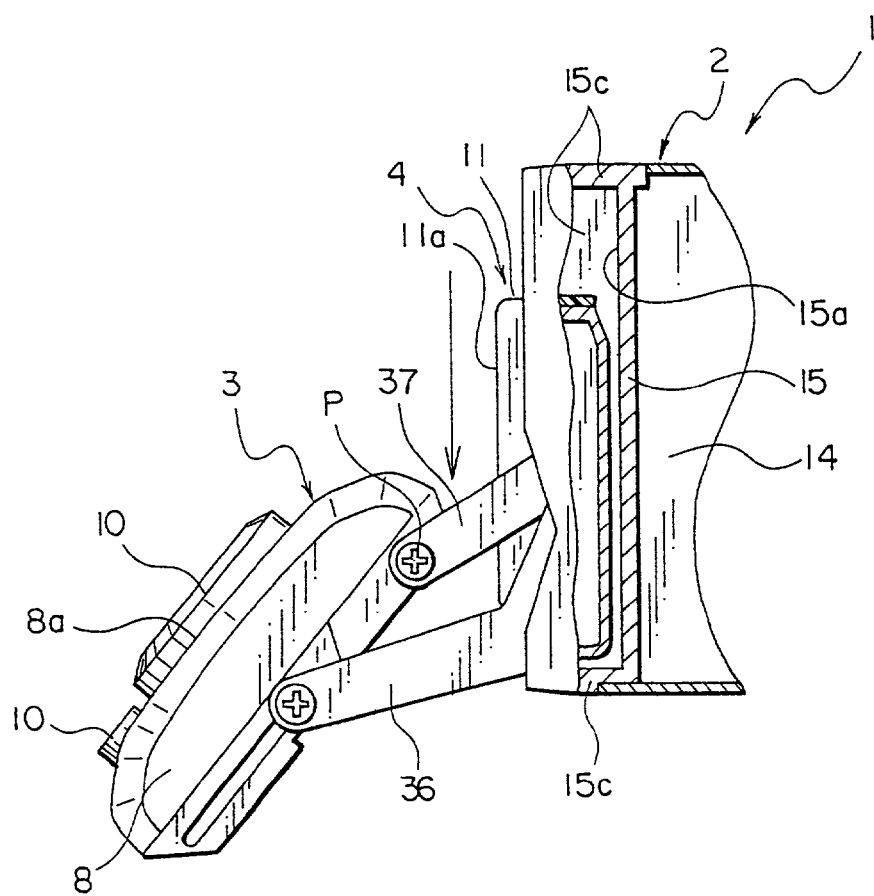
FIG. 33 is a side view of an electronic instrument shown in FIG. 28 partially in section when the first operation unit and the second operation unit have moved to the third position.
Figure 34:
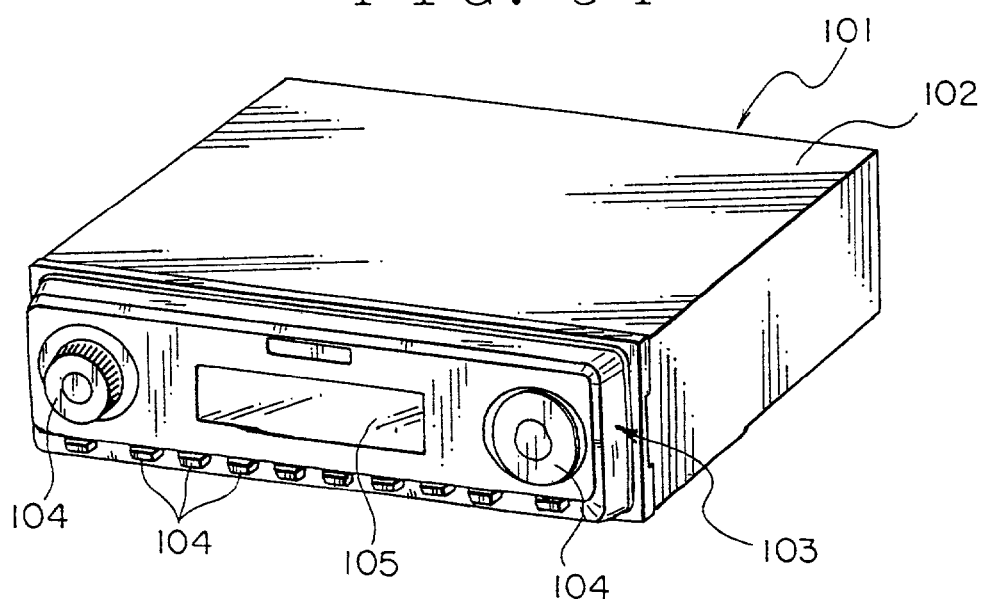
FIG. 34 is a perspective view of a conventional electronic instrument.
Figure 35:
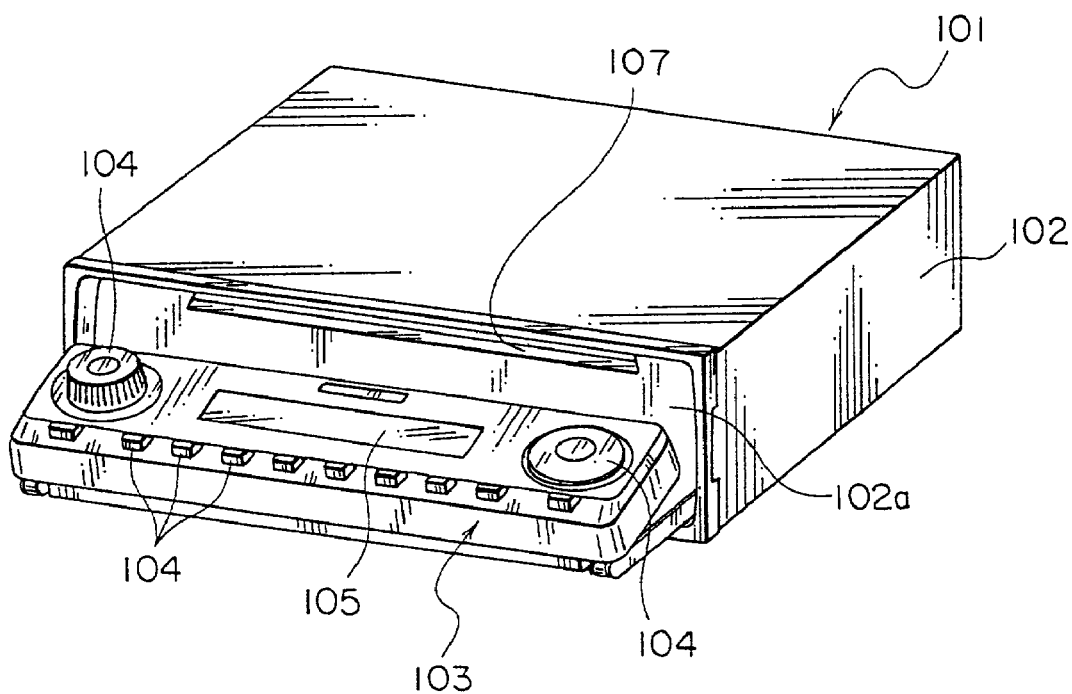
FIG. 35 is a perspective view of the electronic instrument shown in FIG. 34 of the electronic instrument when the operation unit thereof has moved to the second position.
Figure 36:
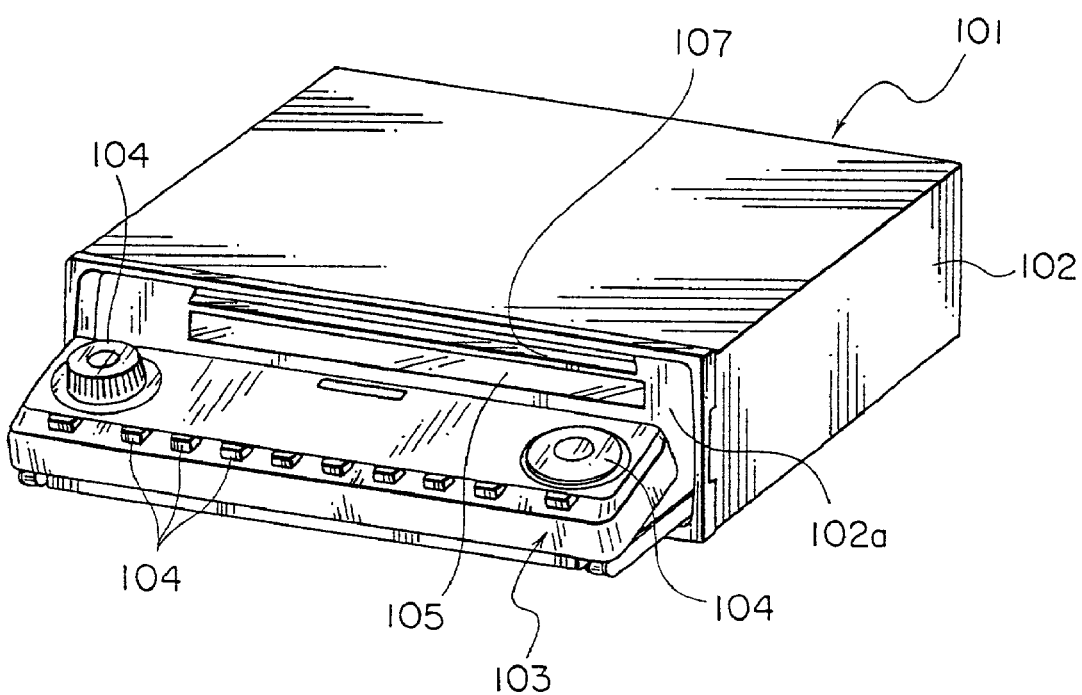
FIG. 36 is a perspective view of another conventional electronic instrument.

In this case, the first operation unit 3 and the second operation unit 4 are moved from the first position as shown in FIGS. 28 and 29 to the third position shown in FIGS. 32 and 33 through the second position as shown in FIGS. 30 and 31.

At the first position, the exposed plane 8a of the first operation unit 3 is opposite to the exposed plane 11a of the second operation unit 4. During the movement from the first position to the second position, the first operation unit 3 is rotated in the direction of arrow S in FIG. 29 (and FIG. 31) around the coupling point with the second arm 37 (first rotating center P in FIGS. 29, 31 and 33) so that the exposed plane 8a is opposite to the user. The exposed plane 8a of the first operation unit 3 is opposite to the user. In this way, the first operation unit 3 and first holder 39 are rotated so that the exposed plane 8a is oriented reverse to that at the first position.

Further, the second operation unit 4 is rotated around the second rotating center R so that the exposed plane 11a is oriented upward. Thus, the first operation unit 3 and the second operation unit 4 move to the second position shown in FIGS. 30 and 31.

During the movement from the second position to the third position, the second operation unit 4 moves downward. Then, the recording medium inserting slot 7 is exposed. Thus, the first operation unit 3 and second operation unit 4 move to the third position shown in FIGS. 32 and 33.

In the case shown in FIGS. 28 to 33, at the second position, the respective exposed planes 8a and 11a of the first operation unit 3 and second operation unit 4. Therefore, the areas of the displayed planes of the LCDs 9 and 12 provided on the exposed planes 8a and 11a can be increased. The user can satisfactorily visually recognize the operating status of the electronic instrument through the LCDs provided on the exposed planes 8a and 11a.

By providing the first operation unit 3 with switches 10 for selecting the broadcasting station to be received by e.g. the AM/FM tuner, and providing the second operation unit 4 with switches 13 for selecting the song to be played back by the CD player, the area where the operating portion is to be located can be expanded and efficiently used.

Further, the first operation unit 3 and the second operation unit 4 are individually moved relatively to the instrument body 2. Thus, the displacement of the first operation unit 3 and the second operation unit 4 from the instrument body 2 from the first position to the second position where the exposed planes 8a and 11a are exposed can be minimized. Therefore, where the electronic instrument 1 is attached to the instrument panel, interference of the first operation unit 3 and the second operation unit 4 with the instrument such as a gear lever of a vehicle can be prevented.

At the second position, the exposed planes 8a and 11a are oriented upward. Therefore, the user faces the LCDs 9 and 12 provided on the exposed planes 8a and 11a. The user can easily visually recognize the information displayed on the LCDs 9 and 12, and hence the operating status of the electronic instrument 1.

What is claimed is:

1. An electronic instrument comprising an instrument body, a first operation unit and a second operation unit which are movable relatively to the instrument body, wherein
the first operation unit and second operation unit have exposed planes to be exposed in front of a front plane of said instrument body,
said first operation unit and second operation unit are movable between a first position where the exposed plane of said first operation unit, the exposed plane of said second operation unit and the front plane of said instrument body are arranged in such an arrangement direction as to overlap one another so that the exposed plane of said first operation unit is located in front of the exposed plane of said second operation unit and the exposed plane of said second operation unit is located in front of the front plane of said instrument body, and a second position where the respective exposed planes of said first operation unit and said second operation unit are exposed,
said first operation unit and said second operation unit are connected movably to the instrument body and are moved relatively to said instrument body when they are moved between said first position and said second position, and
said electronic instrument further comprises a driving mechanism for moving said first operation unit and said second operation unit,
wherein each of said first operation unit and said second operation unit is movably and respectively held by the driving mechanism.

2. An electronic instrument according to claim 1, wherein a recording medium inserting slot from which a recording medium can be inserted into the instrument body is made in the front plane of said instrument body,
said recording medium inserting slot is covered with said second operation unit when said first operation unit and said second operation unit are located at the first position, and
said first operation unit and said second operation unit are movable relatively to said instrument body to a third position where said recording medium inserting slot is exposed.

3. An electronic instrument according to claim 2, wherein said second operation unit moves downward of said instrument body from said first position to said third position and moves from said third position to said second position upward of said instrument body.

4. An electronic instrument according to claim 2, wherein said second operation unit moves from the third position to said second position after said first operation unit has moved to said second position or while said first operation unit moves toward said second position.

5. An electronic instrument according to claim 1, wherein said first operation unit moves from the first position so as to leave from the front plane of said instrument body in said arrangement direction, and thereafter moves downward of said instrument body to said second position.

6. An electronic instrument according to claim 1, wherein immediately after said first operation unit has been situated at the second position, it is rotated around a first rotary center in a width direction of said instrument body so that the exposed plane of said first operation unit is oriented upward.

7. An electronic instrument according to claim 1, wherein immediately after said second operation unit has been situated at the second position, it is rotated around a second rotary center in a width direction of said instrument body so that the exposed plane of said second operation unit is oriented upward.

8. An electronic instrument according to claim 1, wherein when said first operation unit and said second operation unit have been situated at the second position, their respective exposed planes become in parallel to each other.

9. An electronic instrument according to claim 1, wherein said first operation unit is removable from a holder attached to said instrument body,
said holder with the first operation unit attached is movable between said first position and second position,
when said first operation unit is detached from said holder, said second operation unit is situated at the first position between said holder and the front plane of said instrument body, and said holder, the second operation unit and the front plane of said instrument body are arranged to overlap one another.

10. An electronic instrument according to claim 1, wherein when said first operation unit and said second operation unit are situated at the first position, their exposed planes are opposite to each other, and
while the first operation unit moves from said first position to said second position, it rotates around a first rotary center in a width direction of said instrument body so that its exposed plane is oriented in a direction reverse to that when the first operation unit is situated at the first position.

11. An electronic instrument according to claim 10, wherein immediately after said first operation unit has been situated at the second position, it is rotated around the first rotary center in a width direction of said instrument body to orient the exposed plane thereof upward, and
immediately after said second operation unit has been situated at the second position, it is rotated around the second rotary center in a width direction of said instrument body to orient the exposed plane thereof upward.

12. An electronic instrument according to claim 1, wherein the second operation unit comprises a first operational input device,
wherein a user can generate a first electrical signal for the electronic instrument by operating the first operational input device.

13. An electronic instrument according to claim 12, wherein the first operation unit comprises a second operational input device,
wherein a user can generate a second electrical signal for the electronic instrument by operating the second operational input device.

14. An electronic instrument comprising an instrument body, a first operation unit and a second operation unit which are movable relatively to the instrument body, wherein the first operation unit and second operation unit have exposed planes to be exposed in front of a plane of said instrument body, said first operation unit and second operation unit are movable between a first position where the exposed plane of said first operation unit, the exposed plane of said second operation unit and the plane of said instrument body are arranged in such an arrangement direction as to overlap one another so that the exposed plane of said first operation unit is located in front of the exposed plane of said second operation unit and the exposed plane of said second operation unit is located in front of the plane of said instrument body, and a second position where the respective exposed planes of said first operation unit and said second operation unit are exposed, said first operation unit and said second operation unit are moved relatively to said instrument body when they are moved between said first position and said second position wherein a recording medium inserting slot from which a recording medium can be inserted into the instrument body is made in the plane of said instrument body, said recording medium inserting slot is covered with said second operation unit when said first operation unit and said second operation unit are located at the first position, said first operation unit and said second operation unit are movable relatively to said instrument body to a third position where said recording medium inserting slot is exposed, and wherein said second operation unit moves downward of said instrument body from said first position to said third position and moves from said third position to said second position upward of said instrument body.

15. An electronic instrument comprising an instrument body, a first operation unit and a second operation unit which are movable relatively to the instrument body, wherein the first operation unit and second operation unit have exposed planes to be exposed in front of a plane of said instrument body, said first operation unit and second operation unit are movable between a first position where the exposed plane of said first operation unit, the exposed plane of said second operation unit and the plane of said instrument body are arranged in such an arrangement direction as to overlap one another so that the exposed plane of said first operation unit is located in front of the exposed plane of said second operation unit and the exposed plane of said second operation unit is located in front of the plane of said instrument body, and a second position where the respective exposed planes of said first operation unit and said second operation unit are exposed, said first operation unit and said second operation unit are moved relatively to said instrument body when they are moved between said first position and said second position wherein a recording medium inserting slot from which a recording medium can be inserted into the instrument body is made in the plane of said instrument body, said recording medium inserting slot is covered with said second operation unit when said first operation unit and said second operation unit are located at the first position, said first operation unit and said second operation unit are movable relatively to said instrument body to a third position where said recording medium inserting slot is exposed, and wherein said second operation unit moves from the third position to said second position after said first operation unit has moved to said second position or while said first operation unit moves toward said second position.

* * * * *